United States Patent [19]

Pinnavaia et al.

[11] Patent Number: 5,334,564
[45] Date of Patent: * Aug. 2, 1994

[54] METHOD FOR THE PREPARATION OF HIGHLY REACTIVE CLAY COMPOSITES FOR THE REMOVAL OF $SO_x$ FROM FLUE GAS STREAMS

[75] Inventors: Thomas J. Pinnavaia; Jayantha Amarasekera, both of East Lansing, Mich.

[73] Assignee: Board of Trustees operating Michigan State University, East Lansing, Mich.

[ * ] Notice: The portion of the term of this patent subsequent to Jun. 30, 2009 has been disclaimed.

[21] Appl. No.: 846,583

[22] Filed: Mar. 5, 1992

Related U.S. Application Data

[63] Continuation-in-part of Ser. No. 553,254, Jul. 16, 1990, Pat. No. 5,219,536, and a continuation-in-part of Ser. No. 719,987, Jun. 24, 1991, Pat. No. 5,126,300.

[51] Int. Cl.$^5$ ............... B01D 53/34; B01J 20/12; B01J 21/16; C01B 17/60
[52] U.S. Cl. .................... 502/84; 252/189; 252/190; 252/191; 423/244.04; 502/406
[58] Field of Search .......... 252/189, 190, 191, 322; 423/244.04; 502/84, 406

[56] References Cited

U.S. PATENT DOCUMENTS

| | | | |
|---|---|---|---|
| 4,201,751 | 5/1980 | Hölter et al. | 423/210 |
| 4,241,033 | 12/1980 | Ginger et al. | 252/190 X |
| 4,350,670 | 9/1982 | Matsuda et al. | 423/244.04 |
| 4,452,910 | 6/1984 | Hopkins et al. | 502/84 |
| 4,830,840 | 5/1989 | Bhattacharyya | 423/239 |
| 4,952,382 | 8/1990 | Broekhoven | 423/244 |
| 5,114,691 | 5/1992 | Pinnavaia et al. | 423/244 |
| 5,126,300 | 6/1992 | Pinnavaia et al. | 502/84 |
| 5,225,384 | 7/1993 | Pinnavaia et al. | 502/84 X |
| 5,234,877 | 8/1993 | Pinnavaia et al. | 502/84 |

OTHER PUBLICATIONS

Thibault, J. D. Steward, F. R. and Ruthven, D. M., Can J. Chem. Eng., 60 796 (1982).
Kocheffe & Karman in Cand. J. Chem. Eng. 63, 971 to 977 (1985).
Chang, J. C. S. & Kaplan N., Envir. Prog., 3 267 (1984).
Fuller El L. & Yoos, T. R. Langmuir, 3 753 (1987).
Jozewicz W. & Rochelle G. T., Envir. Prog., 5 219 (1986).
Jozewicz, W., Chang, J. C. S. Sedman, C. B. & Brna, T. G., JAPCA 38 796 (1988).
Jozewicz, W., Chang J. C. S. Sedman, C. B., & Brna T. G., React. Solids 6 243 (1988).
Jozewicz, W., et al., EPA/600/d-87/095 (NTIS PB87-175857/AS) Mar. 1987.
Joezwicz, W., et al., EPA/600/D-87/135 (NTIS PB87-18 2663) Apr. 1987.
Chang J. C. S., et al., "Fossil Fuels Utilization: Environmental Concerns" (Eds. R. Markuszewski, B. Blaustein) Chap. 15) 1986.
Neumann et al., Z. Electrochem., 38, 304–310 (1932).
Crystal Structures of Clay Minerals & Their X-ray Identification (Eds., Brindley, G. W. & Brown G.) Chap 1) 1980.
Laszlo, P., Science, 235 1473 (1987).
Gullett, B. K. and Blom, J. A., React. Solids, 3 337 (1987).
Gullet, B. K., Blom, J. A. & Cunningham, R. T., React. Solids, 6 263 (1988).
Chang, E. Y. & Thodes, G., AIChE J., 30 450 (1984).

*Primary Examiner*—Richard D. Lovering
*Attorney, Agent, or Firm*—Ian C. McLeod

[57] ABSTRACT

The use of base/clay composites materials as sorbents for the removal of $SO_2$ and $SO_3$ ($SO_x$) from flue gas and other sulfur containing gas streams is described. The base is either an alkaline earth metal carbonate (eg. $CaCO_3$) or hydroxide (eg. $Ca(OH)_2$) is incorporated onto the clay by precipitating from corresponding metal oxide (eg. CaO) in an aqueous clay slurry. A second metal oxide or oxide precursor, preferably selected from transition metal ions, capable of promoting the oxidation of sulfur dioxide to sulfur trioxide, is incorporated to the base/clay composite during the synthesis in the form of finely divided metal oxide powder, metal oxide sol, water soluble metal salt or as clay-intercalated metal cation. The use of clay as dispersing agent for both the basic oxide and the second metal oxide component decreases the particle agglomeration of base particles and increases the rate of $SO_x$ uptake compared to the bulk bases in current use.

64 Claims, 3 Drawing Sheets

METHOD FOR THE PREPARATION OF HIGHLY REACTIVE CLAY COMPOSITES FOR THE REMOVAL OF $SO_x$ FROM FLUE GAS STREAMS

CROSS-REFERENCE TO RELATED APPLICATIONS

This application is a continuation-in-part of U.S. application Ser. No. 07/553,254, filed Jul. 16, 1990, now U.S. Pat. No. 5,219,536 and of U.S. application Ser. No. 07/719 987, filed Jun. 24 , 1991, now U.S. Pat. No. 5,126,300.

BACKGROUND OF THE INVENTION

(1) Field of the Invention

This invention relates to a method for the preparation of base/clay composites for the removal of $SO_x$ (sulfur dioxide and sulfur trioxide) from sulfur-containing gas streams, particularly flue gas streams from coal burning power plants. The base component in the composite is selected from the alkaline earth metal hydroxides and carbonates. The composite contains a second metal oxide or metal oxide precursor, preferably selected from transition metal ions, capable of promoting the oxidation of sulfur dioxide to sulfur trioxide.

(2) Prior Art

Coal represents the largest resource of fossil energy in the world, today. For example, it has been estimated that the known coal reserves in the U.S. alone could supply sufficient energy for domestic consumption for several hundred years. One of the major problems in using coal as an energy source is the presence of sulfur. In fossil-fuel-fired power plants, the sulfur content of the feed coal is oxidized during combustion to sulfur oxides ($SO_2$ and $SO_3$, commonly referred to as "$SO_x$"), which are released through stacks to the atmosphere. Analyses of flue gas produced by power plants burning coal before desulfurization, show 0.5%–0.2% $SO_2$ and about 0.005% $SO_3$. One of the most serious environmental problem associated with such sulfur emissions is the generation of sulfuric acid, resulting in the so-called "acid rain".

Control of sulfur oxide emissions is mandated by the United States Environmental Protection Agency (EPA), and in 1970, the Clean Air Act Amendments were adopted by the U.S. government for this purpose. This legislation provided for enforcement, by the EPA, of $SO_x$ emissions limits for power plants constructed or modified after Aug. 17, 1971. This Act spurred extensive flue gas desulfurization (FGD) research and various studies are under way to develop methods for $SO_x$ removal from flue gas streams. As of January 1984, calcium based, wet, throwaway systems ( including lime, limestone, and alkaline-ash systems) accounted for 84 percent of existing and planned FGD capacity. The Clean Air Act was amended in 1977 and very recently in 1990, to require further control of $SO_x$ emissions. The Clean Air Act of 1990 requires, among other things, that coal-fired power plants cut sulfur dioxide emissions by half, or about 9 million tons annually, in the next decade. Increasing federal regulations and the high cost to construct and operate existing wet FGD units have encouraged continued research on new or modified flue gas cleanup processes.

Controlling the emissions of $SO_x$ from power plants is a world-wide problem and research into its control is a global effort. Formation of $SO_x$ in combustion processes can be reduced by modifying the burner design and combustion system, by changing the operating conditions and by using fuels with lower sulfur contents. The most popular and inexpensive method of reducing $SO_x$ emission is the addition of reactive dry sorbents with the fuel. Accordingly at present, $SO_x$ removal is most often accomplished by using lime (CaO), lime stone ($CaCO_3$) or hydrated lime ($Ca(OH)_2$) due to cost effectiveness and available quantities. For example, in U.S. Pat. No. 4,731,233 by Thompson and Nuzio, describe the use of these calcium based sorbents to reduce $SO_x$ emissions from flue gas streams.

In typical coal-fired power plants the ground sorbent, for example lime or limestone, is added into boilers along with coal or sprayed into towers as a slurry to contact the flue gas stream. The $SO_2$ reacts with calcium hydroxide to form a calcium sulfite slurry which is then partially oxidized with air to calcium sulfate. In this way the sulfur oxides are retained as harmless solid compounds which can be removed from the stack gas by electrostatic precipitation or other standard methods. Such a process is potentially attractive for retro-fitting existing power plants since no major structural alterations are required.

Although calcium based systems are the major source of $SO_x$ control they are not without problems. Agglomeration of particles can be a serious problem that results in a less than optimal conversion to $CaSO_x$, ($CaSO_3$ and $CaSO_4$). The activity of the calcium species decreases as its particle size increases. Also $CaSO_x$, occupies more volume than CaO, the common active species. Therefore, an increase in volume occurs as the reaction proceeds, which causes a loss in the original porous character of the CaO. This results in a blockage of $SO_x$ and $O_2$ to the active CaO centers (Gullett, B. K. and Blom, J. A., React. Solids, 3 337 (1987); Gullett, B. K., Blom, J. A. and Cunningham, R. T., React. Solids, 6 263 (1988); Chang, E. Y. and Thodes, G., AIChE J., 30 450 (1984); Thibault, J. D., Steward, F. R. and Ruthyen, D. M., Can. J. Chem. Eng., 60 796 (1982)). Hence in the relatively short contact time available, only a small fraction of the sorbent reacts. In principle the problem of low utilization of the sorbents may be solved by reducing the particle size, but in practice, the particle size required for a reasonable level of utilization may be too small to achieve economically by conventional grinding or fragmentation methods.

Thermodynamic calculations indicate that the capture of sulfur trioxide with metal oxides is more favorable compared to sulfur dioxide. Several experimental results have suggested that catalytic oxidation of sulfur dioxide to sulfur trioxide can be beneficial for stack gas desulfurization. Kocheffe & Karman in Cand. J. Chem. Eng., 63, 971 to 977 (1985) has shown that the rate of reaction of $SO_3$ with Ca, Mg and ZnO is greater than that of sulfur dioxide with the same oxides under identical conditions. Furthermore, inclusion of $Fe_2O_3$ (as a $SO_2$ oxidation catalyst) leads to more effective utilization of the lime. The addition of a small amount of $Fe_2O_3$ gave both a more rapid initial uptake rate and a much higher final conversion of the lime (80–90%). In the absence of an oxidation catalyst the rate of $SO_2$ absorption declined sharply at about 70% conversion.

Several methods have been used to develop reactive limestone, lime or hydrated lime as a precursor for the active CaO species or have used $Ca(OH)_2$ as the active species. Generally, the active species has been used as a bulk phase and not as a dispersed species (Chang, J. C.

S. and Kaplan, N., Envir. Prog., 3 267 (1984); Gullett, B. K., Blom, J. A. and Cunningham, R. T., React. Solids, 6 263 (1988); Chang, E. Y. and Thodes, G., AIChE J., 30 450 (1984); Fuller El L. and Yoos, T. R., Lanqmuir, 3 753 (1987)). Recent work has concentrated on the addition of fly ash to Ca(OH)$_2$ to enhance its activity in SO$_x$ control (Jozewicz, W. and Rochelle, G. T., Envir. Prog, 5 219 (1986); Jozewicz, W., Chang, J. C. S., Sedman, C. B. and Brna, T. G., JAPCA, 38 796 (1988); Jozewicz, W., Chang, J. C. S., Sedman, C. B. and Brna, T. G., React. Solids, 6 243 (1988); Jozewicz, W., Chang, J. C. S., Sedman, C. B. and Brna, T. G., EPA/600/d-87/095, (NTIS PB87-175857/AS); Jozewicz, W., Chang, J. C. S., Sedman, C. B. and Brna, T. G., EPA/600/D-87/135, (NTIS PB87-182663). The fly ash is a siliceous material and formation of various calcium silicates can occur. Several diatomaceous earths, montmorillonite clays and kaolins have also been identified as containing reactive silica (Jozewicz, W., Chang, J. C. S., Sedman, C. B. and Brna, T. G., React. Solids, 6 243 (1988)).

U.S. Pat. No. 4,830,840 has recently, described a sorbent composition containing an alkaline earth metal, aluminum-containing spinel/clay compositions for SO$_x$ capture. This patent describes the use of kaolin clays as the matrix material.

U.S. Pat. No. 4,952,382 by van Broekhoven has recently disclosed a catalyst composition suitable for the refining of heavy sulfur- and metal-containing petroleum feeds. An "anionic clay" component present in the catalyst serves as the sorbent for removal of SO$_x$ from feed gas in fluidized catalytic cracking units. Anionic clays are primarily synthetic clays. Their natural abundance is very low. The clay layers in anionic clays are composed of non silicate materials and have found no cations in the clay gallery. As a result these clays do not undergo swelling in water.

(3) Objects

It is a principal object of the present invention to provide sorbent compositions suitable for diminishing SO$_x$ from flue gas streams particularly from coal-fired power plants. It is an object to provide sorbent compositions which give better SO$_x$ uptake in shorter time duration to overcome the low utilization of common oxide sorbents such as CaO and MgO due to mass transfer limitation and low reactivity of SO$_2$. Further, it is an object of the present invention to provide sorbent composite materials which are inexpensive to produce. These and other objects will become increasingly apparent from the following description and the drawings.

Figure 1:
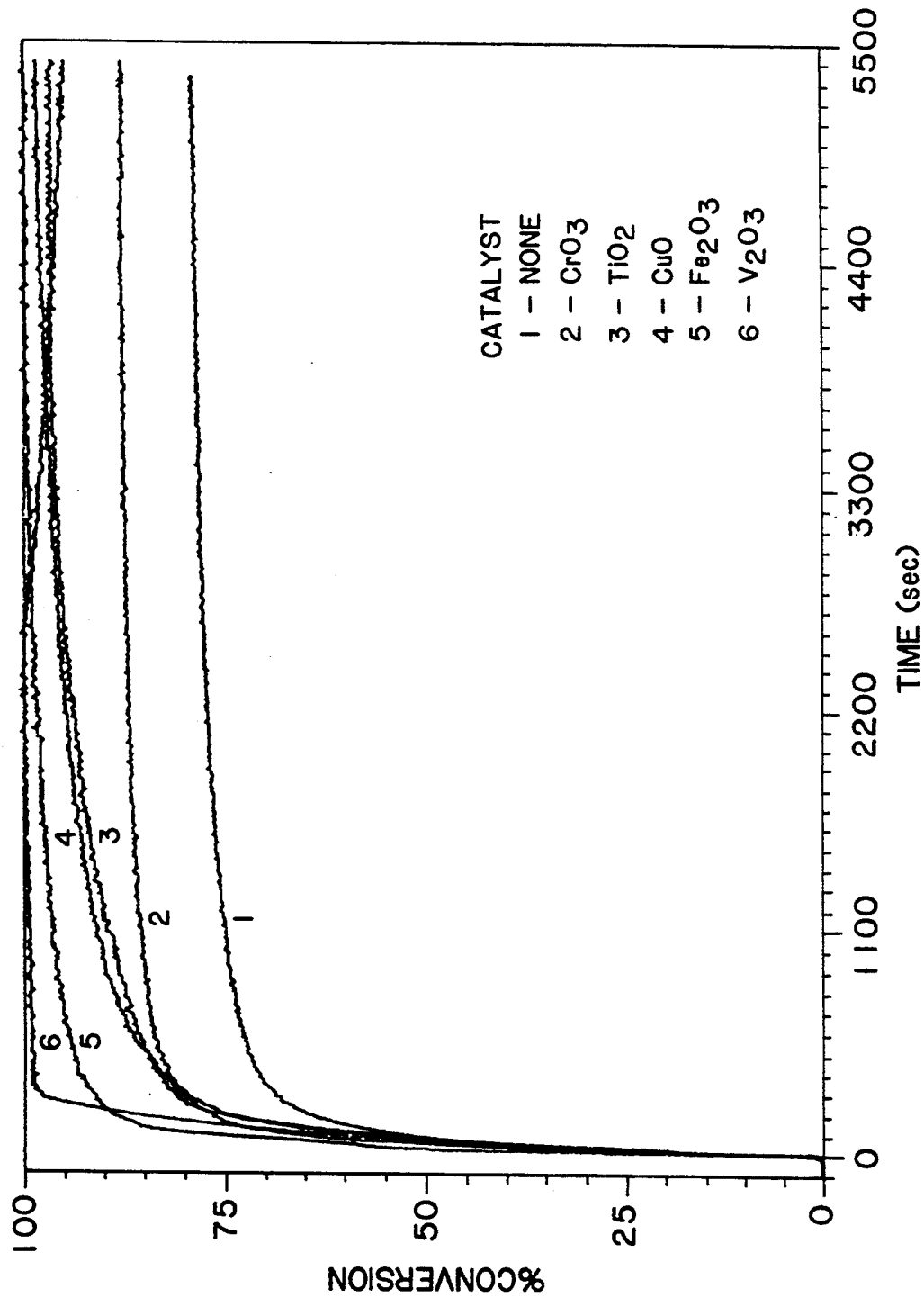
FIG. 1 is a graph showing the SO$_2$ reactivity of different transition metal containing CaCO$_3$/clay sorbents. The CaO/Clay weight ratio was 3:1 and the transition metal is incorporated as its oxide is as indicated by nos. 1 to 6 with a transition metal loading at 5.4 g/100 g CaO. The reaction was at 900° C. in a 80% N$_2$/20% O$_2$ gas stream with 5000 ppm SO$_2$. The percent conversion is expressed as fraction of Ca sites converted to CaSO4.

GENERAL DESCRIPTION present invention relates to a method for preparing a composite material useful for SO$_x$ removal from a flue gas stream of a coal burning power plant and other gas streams which comprises:

(a) providing a mixture with water of a smectite clay, a basic compound selected from the group consisting of alkaline earth metal oxides, hydroxides, carbonates and mixtures thereof dispersed in the clay and a quantity of a second metal ion in a form selected from the group consisting of metal oxides, metal oxide precursors and mixtures thereof dispersed in the composite wherein the metal ion is present in an amount which promotes oxidation of sulfur dioxide to sulfur trioxide; and (b) heating the mixture to provide the composite material, wherein when the composite material is heated to a temperature of 500° C. or above in the presence of SO$_x$ in the gas stream the SO$_x$ are removed by the composite material.

The present invention also relates to a method for removing SO$_x$ from a flue gas stream of a coal-burning power plant and other gas streams which comprises: providing a dried or calcined mixture of a basic compound selected from the group consisting of alkaline earth metal oxides, hydroxides, carbonates and mixtures thereof, dispersed in the clay, and a second metal ion in a form selected from the group consisting of metal oxides, metal oxide precursors and mixtures thereof dispersed in the clay, wherein the metal ion is present in an amount which promotes oxidation of sulfur dioxide to sulfur trioxide; and heating the composite mixture in the presence of the flue gas containing SO$_x$ to remove the SO$_x$.

Improved and highly reactive composite material sorbents for SO$_x$ removal are described, which consist of three components; (i) an effective catalyst that oxidizes SO$_2$ to SO$_3$, (ii) a highly reactive base site to chemisorb the SO$_3$ formed much more effectively, and (iii) a matrix that act as a dispersing medium for both base and catalyst. In these composites, alkaline earth metals in the form of metal hydroxides or metal carbonates are used as base components. A smectite clay which serves as a support or matrix for the reactive base as well as for the oxidation catalysts. A second metal oxide or oxide precursor, preferably selected from transition metal ions and rare earth metals and capable of promoting the oxidation of sulfur dioxide to sulfur trioxide, is incorporated in the composite material. In the preferred method, lime (CaO) is used as the precursor base component, which is then converted into slaked lime (Ca(OH)$_2$) in water and preferably carbonated in the presence of carbon dioxide (CO$_2$) to form lime (CaCO$_3$).

The smectite type clays serves as a support for the reactive base and as a dispersing agent for improved reactivities of the base components towards SO$_x$. The transition metal ions present in these sorbents act as catalysts for the oxidation of SO$_2$ to much more reactive SO$_3$. The use of clay as dispersing agent for both the basic oxide and the catalytic oxide component decreases the particle agglomeration of base particles and increases the rate of $SO_x$ uptake compared to the bulk bases in current use.

The present invention uses several preferred methods for preparing composite materials useful for the absorption of $SO_x$ components from gas streams. In each method, a transition metal component capable of promoting the oxidation of $SO_2$ to $SO_3$ is introduced into the base/clay composite using various transition metal precursors. Accordingly, one preferred method comprises: providing a suspension of a smectite clay containing 0.1 to 5% w/w of clay in water; adding a quantity of basic compound selected from the group consisting of alkaline earth metal oxides or hydroxides as a solid or as a suspension in water to the clay suspension; adding a quantity of second metal ion in the form of a metal oxide or oxide precursor, which provides oxidation of sulfur dioxide to sulfur trioxide in an amount sufficient that said composite composition promotes the oxidation of the sulfur dioxide to sulfur trioxide at sulfur dioxide oxidation conditions; mixing the resulting suspension by stirring and allowing a precipitate to form; recovering the precipitate from the water, preferably by filtration, by centrifugation or as a slurry; and drying the suspension or the precipitate in air preferably at ambient temperatures or in an oven at temperatures between 100° and 110° C. to provide the composite material, wherein when the composite material is heated to a temperature of 500° C. or above, the $SO_x$ components from a gas stream are removed by the composite upon contacting with the said gas stream at that temperature.

A second preferred method of the present invention comprises: providing a suspension of a smectite clay containing 0.1 to 5% w/w of clay in water; adding calcium hydroxide as a solid or as a suspension in water to the clay suspension; adding a quantity of second metal ion in the form of a metal oxide or oxide precursor, which provide oxidation of sulfur dioxide to sulfur trioxide in an amount sufficient that said composite composition promotes the oxidation of the sulfur dioxide to sulfur trioxide at sulfur dioxide oxidation conditions; providing carbon dioxide in the resulting suspension, preferably by stirring with carbon dioxide gas present in water, or by stirring while bubbling $CO_2$ gas through the suspension to form calcium carbonate from calcium hydroxide; recovering the precipitate from at least some of the water preferably by filtration, by centrifugation or as a slurry; and drying the precipitate in air, preferably at ambient temperatures or in an oven at temperatures between 100° and 110° C. to provide the composite material, wherein when the composite material is heated to a temperature of 500° C. or above, the $SO_x$ components from a gas stream are removed by the composite material upon contacting with the said gas stream at that temperature.

Another preferred method of the present invention for preparing a composite material useful for $SO_x$ removal from the flue gas of a coal-burning power plant and other gas streams which comprises: providing a suspension of a smectite clay containing 0.1 to 5% w/w of clay in water; adding a quantity of basic compound selected from the group of alkaline earth metal oxides or hydroxides as a solid or as a suspension in water to the clay suspension; mixing the resulting suspension by stirring and allowing a precipitate to form; recovering the precipitate from at least some of the water preferably by filtration, by centrifugation or as a slurry; drying the precipitate in air at ambient temperatures or in an oven at 110° C.; adding a second metal cation, which provides oxidation of sulfur dioxide to sulfur trioxide in an amount sufficient that said composite promotes the oxidation of the sulfur dioxide to sulfur trioxide at sulfur dioxide oxidation conditions, in the form of metal salt by impregnating the dried precipitate with an aqueous solution of the metal salt, and drying to produce the composite material, wherein when the composite material is heated to a temperature of 500° C. or above, the $SO_x$ components from a gas stream are removed by the composite upon contacting with the said gas stream at that temperature.

Yet another preferred method of the present invention for preparing a composite material useful for $SO_x$ removal from the flue gas of a coal-burning power plant and other gas streams which comprises: providing a suspension of a smectite clay containing 0.1 to 5% w/w of clay in water; adding a quantity of calcium hydroxide to the clay suspension; providing carbon dioxide in the suspension, preferably by mixing the resulting suspension by stirring with carbon dioxide gas present in water or by stirring while bubbling carbon dioxide gas through the suspension to form calcium carbonate from the carbon hydroxide and allowing a precipitate to form; recovering the precipitate from at least some of the water preferably by filtration, by centrifugation or as a slurry; and drying the precipitate in air, preferably at ambient temperatures or in an oven at 110° C. to provide a dried precipitate, adding a second metal cation, which provides oxidation of sulfur dioxide to sulfur trioxide in an amount sufficient that said composite promotes the oxidation of the sulfur dioxide to sulfur trioxide at sulfur dioxide oxidation conditions to the dried precipitate in the form of metal salt by impregnating the dried precipitate with the aqueous solution of metal salt, and drying the product, wherein when the composite material is heated to a temperature of 500° C. or above, the $SO_x$ components from a gas stream are removed by the composite upon contacting with the said gas stream at that temperature.

This invention discloses another preferred method for preparing a composite material useful for $SO_x$ removal from the flue gas of a coal-burning power plant and other gas streams which comprises: providing a suspension of 0.1 to 5% w/w of clay in water of a smectite clay containing a transition metal ion, wherein the said transition metal promotes the oxidation of the sulfur dioxide to sulfur trioxide at sulfur dioxide oxidation conditions; adding a quantity of basic compound selected from the group of alkaline earth metal oxides or hydroxides as a solid or as a suspension in water to the clay suspension; mixing the resulting suspension by stirring and allowing a precipitate to form; recovering the precipitate from at least some of the water preferably by filtration, by centrifugation or as a slurry; and drying the precipitate in air preferably at ambient temperatures or in an oven at a temperature between 100°–120° C. to provide the composite material, wherein when the composite material is heated to a temperature of 500° C. or above, the $SO_x$ components from a gas stream are removed by the composite upon contacting with the said gas stream at that temperature.

Further, the invention relates to a preferred method for preparing a composite material useful for $SO_x$ removal from the flue gas of a coal-burning power plant and other gas streams which comprises: providing a suspension of 0.1 to 5% w/w of clay in water of a smectite clay containing a transition metal ion, wherein the said transition metal promotes the oxidation of the sulfur dioxide to sulfur trioxide at sulfur dioxide oxidation conditions; adding a quantity of calcium hydroxide to the clay suspension; providing carbon dioxide in the suspension, preferably mixing the resulting suspension by stirring with carbon dioxide gas present in water, or by stirring while bubbling carbon dioxide gas through the suspension to form calcium carbonate from calcium hydroxide and allowing a precipitate to form; recovering the precipitate from at least some the water preferably by filtration; by centrifugation or as a slurry; and drying the precipitate in air preferably at ambient temperatures or in an oven at a temperature between 100°–120° C. to provide the composite material, wherein when the composite is heated to a temperature of 500° C. or above, the $SO_x$ components from a gas stream are removed by the composite upon contacting with the said gas stream at that temperature.

In the present invention, smectite type clays are used, which have swelling properties, contrast to the kaolin type clays. The major difference between the smectite type clay and the kaolin type clay is the ability to swell in water. These swelling properties of the smectite clays are responsible for the higher reactivity of the sorbents of this invention.

U.S. Ser. No. 07/553,254 now U.S. Pat. No. 5,219,536, discloses the preparation of a clay-composite materials useful for removing $SO_x$ from a gas streams In this method alkali and alkaline earth oxides or carbonates such as $NaHCO_3$ and $CaCO_3$ were precipitated in the presence of a smectite clay suspensions from respective salts or were impregnated onto clay using water soluble compounds. When these composite materials are heated to at least 500° C. the $SO_x$ is removed from the gas streams by the basic compound.

In accordance with one method of the previous application, a 0.5 to 1.5 weight percent, wt. %, aqueous suspension of clay was initially prepared. An aqueous solution of $Na_2CO_3$ was added dropwise to the clay suspension while it was stirred. This was followed by a similar addition of $CaCl_2.2H_2O$. The addition of the calcium species caused the precipitation of $CaCO_3$. The amount of $Na_2CO_3$ and $CaCl_2.2H_2O$ was varied to provide the desired weight ratio of $CaCO_3$ to clay. The product was washed with deionized distilled water, either by centrifugation/decantation or by dialysis, to remove the excess chloride and sodium ions before drying. Washing the preparation was preferred, because reactivity with $SO_x$ was diminished if no attempt was made to remove the chloride. The adverse effect of chloride on $SO_x$ removal has also been verified by another study which evaluated the effects of magnesium and chloride ions on the performance of limestone-regenerated dual alkali processes under closed-loop operating conditions (Chang, J. C. S., Kaplan, N. and Brna, T. G. in "Fossil Fuels Utilization: Environmental Concerns" (Eds. R. Markuszewski, B. Blaustein) Chap. 15). Limestone reactivity decreased with the increase of chloride ion concentration. The effect was especially pronounced after a concentration of 80,000 ppm was reached. The base-clay composites, were thus, thoroughly washed by employing several wash cycles.

One difficulty with this prior art process of making base-clay composites is this extensive washing procedure involved during the synthesis to remove chloride ions. In an industrial scale preparation, this would be not economically feasible. Therefore, in an another invention described in U.S. application Ser. No. 719,987 now U.S. Pat. No. 5,126,300 an improved synthesis of calcium carbonate or calcium hydroxide containing clay composites which are suitable for removing $SO_x$ components from flue gas streams has been disclosed. In this improved process, lime was used as the precursor base components along with smectite type clays, which is then converted into slaked lime, $Ca(OH)_2$ in water or to $CaCO_3$ in the presence of carbon dioxide. This invention provided methods for the production of composite materials consisting of alkaline earth metal bases and smectite clay composites, of varying alkaline earth metal base to clay ratios than had been known in the prior art, especially, and most preferably, by causing the formation of $Ca(OH)_2$ or $CaCO_3$ from CaO onto and between clay particles while the dispersed clay is in aqueous suspension.

A major draw back with these base/clay composite sorbents is the low utilization of the base components in the sorbents. The rate of adsorption of $SO_x$ declines with increasing conversion, due to low reactivity of $SO_2$. Hence in the relatively short contact time available, only about 50–70% of the basic Ca sites in the sorbent reacts. For example the $CaCO_3$/Na-montmorillonite composite which contained 3:1 CaO/clay, when exposed to $SO_2$ (5% v/v) containing stream of nitrogen for 5 min, showed that only 68.7% Ca sites in the composite was reactive towards $SO_x$. Upon exposing the composite to the same gas stream for 1 hour caused only 78.6% reactivity of Ca sites to $SO_x$. Therefore, in the present invention we have disclosed several improved syntheses for the preparation of much more reactive base/clay composites suitable for remove $SO_x$ components from gas streams.

The composite materials of the present invention are also base/smectite clay composites. The base which is either an alkaline earth metal carbonate (eg. $CaCO_3$) or a hydroxide (eg. $Ca(OH)_2$) is incorporated onto the clay by precipitating from corresponding metal oxide (eg. CaO) in an aqueous clay slurry. A second metal oxide or oxide precursor, preferably selected from transition metal ions, capable of promoting the oxidation of sulfur dioxide to sulfur trioxide, is incorporated to the base/clay composite. The use of clay as a dispersing agent for both the basic oxide and the catalytic oxide component increases the rate of $SO_x$ uptake compared to bulk bases in current use. The presence of transition metal oxides as a second metal oxide in these composites overcome the low reactivity of $SO_2$, and facilitates the reactivity of lime towards $SO_x$, The second metal component is preferably a component of a metal selected from the transition metals, rare earth metals, and Group 14 in the periodic table. Some of the known transition metal and transition metal oxide catalysts that are suitable for $SO_2$ oxidation include Pt, $WO_3$, Ag, $Ag_3VO_4$, $Cu_3(VO_4)_2$, $V_2O_5$, $Fe_2O_3$, $TiO_2$, CuO $CrO_3$ $MnO_2$, $PbO_2$, $MoO_3$, $CeO_2$ $Cr_2O_3$, $SnO_2$ and ZnO. Platinum is an excellent oxidation catalyst, and other oxides such as vanadium pentoxide and iron oxides are also especially effective for catalyzing the oxidation of $SO_2$ to $SO_3$; see for example, Neuwmann et. al. in, *Z. Electrochem.*, 38, 304 to 310 (1932). The catalytic process on these oxides will involve the following steps: sorption of $SO_2$ to form a sulfite, oxidation of sulfite to sulfate, and sulfate decomposition with evolution of $SO_3$. Thus for a particular metal oxide sorbent, the selection of a good metal oxide catalyst for $SO_2$ oxidation is very important. Requirements for a good catalyst can be compared to those for the $SO_2$ sorbent. For the catalyst, all three steps are surface reactions and should occur at the reaction temperature. For the $SO_2$ sorbent, the first two steps should occur as bulk reactions converting much of the sorbent to sulfate during sorption at the reaction temperature. The last step should occur at a higher temperature. Typically, alkali metal oxides and its salts meet these latter requirements and find suitable for $SO_x$ capture. The alkali metal oxide such as CaO reacts with $SO_3$ readily at temperatures above 600° C. to form thermally stable sulfates. To enhance the reactivity of base and to improve the performance of the oxidation catalyst, both the base component and the catalyst are dispersed on smectite type clays.

The clays utilized in this invention are members of the smectite group of hydrous 2:1 layer lattice silicates containing two-dimensional tetrahedral sheets of composition $T_2O_5$ (T=tetrahedral cation, i.e. $Si^{4+}$, $Al^{3+}$, or $Fe^{3+}$), in which individual tetrahedra are linked with neighboring tetrahedra by sharing three corners each (the basal oxygens) to form an hexagonal mesh pattern. The fourth tetrahedral corner (the apical oxygen) points in a direction normal to the sheet and at the same time forms part of the immediately adjacent octahedral sheet in which individual octahedra are linked laterally by sharing octahedral edges. The octahedral cations are usually $Mg^{2+}$, $Al^{3+}$, $Fe^{2+}$, and $Fe^{3+}$, but other medium-sized cations also occur in some species. The presence of iron in the clay can be beneficial at $SO_2$ uptake temperatures of 700° C. or less, since iron centers catalyze the oxidation of $SO_2$ to more reactive $SO_3$ in this temperature range.

The smallest structural unit of a smectite clay contains three octahedra. If all three octahedra are occupied, the sheet is classified as trioctahedral. If only two octahedra are occupied and the third octahedron is vacant, the sheet is classified as dioctahedral. The assemblage formed by linking two-tetrahedral sheets with one octahedral sheet is known as a 2:1 layer. The linkage is achieved by inverting the upper tetrahedral sheet so that its apical oxygens point down and can be shared by the octahedral sheet below. Both octahedral anion planes then are of the same O, OH composition. If the 2:1 layers are not electrostatically neutral, the excess layer charge is neutralized by various interlayer materials, including individual cations, and hydroxide octahedral groups and sheets ("Crystal Structures of Clay Minerals and Their X-ray Identification" (Eds. Brindley, G. W. and Brown, G.) Chap. 1.)

Smectites are a type of 2:1 layered silicates. General formulas for di- and trioctahedral smectites are as follows:

dioctahedral 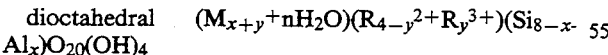

trioctahedral 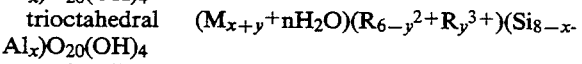

per unit cell. These 2:1 layered silicates have an electron charge/unit cell between 0.4 and 1.2. Montmorillonite is the most common smectite and refers to the dioctahedral Al, Mg smectite with the layer charge arising mainly from the Mg-for-Al substitutions in the octahedral position, i.e. $(M_y + nH_2O)(Al_{4-y}Mg_y)Si_8O_{20}(OH)_4$ per unit cell. Montmorillonites generally have total specific surface areas of the order of 500–850 $m^2/g$, which includes both the interlayer and external surface area ("Crystal structures of Clay Minerals and Their X-ray Identification" (Eds. Brindley, G. W. and Brown G.) Chap. 8, and Laszlo, P., Science, 235 1473 (1987)).

Smectite clays also have the ability to swell in water. The swelling ability of the clay depends upon whether a monovalent or divalent cation is used to neutralize the clay layers. Monovalent ions tend to remain more or less associated with the silicate layers when hydration occurs but divalent ions tend to move into the water layers. Thus the silicate layers and their associated monovalent ions behave in a similar manner to neutral entities with the layers becoming fully dispersed in water. Divalent ion clays appear to be dispersed in small packets generally compromising 4–5 layers. Divalent ions link pairs of layers together by satisfying two negative charges in a manner which monovalent ions cannot.

In situ precipitation of $Ca(OH)_2$ and $CaCO_3$ is an ideal method for preparing a dispersed base. This minimizes mass transfer limitations and results in more efficient use of base/sorbent and faster removal of $SO_2$ from the gas stream. The highly dispersed $CaCO_3$ and $Ca(OH)_2$ decompose in the furnace to CaO. The presence of a highly dispersed clay suspension facilitates a uniform dispersion of the CaO particles as well as $SO_2$ oxidation catalyst. The dispersed base in the composite material thus possesses a different dispersion than when the base is present as the bulk phase. A dispersed base on a support will have a much smaller particle size than could be obtained by grinding. The second metal component selected from transition metal group elements, when present in these composites facilitates the oxidation of $SO_2$ to $SO_3$. The $SO_3$ is more reactive than $SO_2$ by itself and chemisorbs onto the highly reactive base metal oxide (CaO) more effectively to form harmless solid compounds containing metal sulfates. For example, when Fe is present as $Fe_2O_3$ in these composites, it promotes the conversion of $SO_2$ to more reactive $SO_3$. The $SO_3$ thus formed is easily captured by the highly dispersed basic CaO sites to form thermally stable $CaSO_4$. The greater dispersion of the base particles in the composite is conducive to the reaction of the base with reactive $SO_3$ resulting in a more efficient use of the available base. An improvement in $SO_x$ reactivity has been observed with composites containing only small amounts of clay. A ratio of 9:1 base to clay still results in improved uptake over conventional bulk base systems.

In the compositions of the present invention the weight ratio of basic compound to clay before heating is between about 1 to 10 and 10 to 1, preferably between 1 to 1 and 10 to 1. The compound containing the metal ion is preferably in the form of a salt. About 0.1 to 20% by weight metal salt is used based upon the weight of the basic compound.

DESCRIPTION

The present invention provides specific methods of preparing composite materials useful for $SO_x$ removal from the flue gas of coal-burning power plants and other gas streams. In general, an aqueous suspension of smectite clay containing 0.1% to 5% by weight of clay is mixed with a basic material. The basic material is selected from the group consisting of alkaline earth metal oxides, hydroxides and carbonates such as CaO $Ca(OH)_2$ and $CaCO_3$ which form basic metal oxide, CaO at elevated temperatures. These basic metal components are either prepared in situ or introduced into the composite matter in the form of naturally occurring minerals For example $Ca(OH)_2$ containing composites can be prepared by the hydration of lime in the aqueous clay slurry, whereas $CaCO_3$ containing composites are prepared by carbonation (bubbling carbon dioxide gas through) the aforementioned CaO/clay slurry. The resulting suspensions are then treated with second metal components capable of promoting the oxidation of sulfur dioxide to sulfur trioxide. The amount of transition metal added is between 0.5% to 15% based on CaO present in the composite. These second metal components are preferably selected from the transition metal ions and added as metal salts. The resulting slurries are then mixed well and the precipitates thus obtained are recovered by filtration and dried at ambient temperatures or at a temperature between 100° and 120° C. to obtain the base/clay composites containing sulfur dioxide oxidation catalysts. The composites prepared in this manner contain $Ca(OH)_2$ as a major source of calcium alkali sorbent with minor quantities of $CaCO_3$.

The transition metal component, capable of promoting the oxidation of $SO_2$ to $SO_3$ is introduced to the composite in several different ways. In the first method, the transition metal is added as metal oxide in the form of finely divided powder along with CaO, during the composite synthesis. In the second method, the transition metal oxide is added to clay/base slurry as aqueous sol. These sols provided very fine oxide particles that are much more effectively dispersed in the composite. In another method, the clay-base slurry is treated with a finely divided water soluble transition metal salt. In another preferred method, the $SO_2$ oxidation catalysts are introduced into the clay structure, particularly into the clay galleries as transition metal containing cations. Upon calcination, the composites prepared according to these methods formed reactive metal oxide catalysts capable of oxidizing $SO_2$ to $SO_3$ at elevated temperatures.

In the first method disclosed in this invention, the transition metal oxidation catalysts are added as metal oxides in the form of a finely divided powders, during the composite synthesis. Accordingly, CaO is added as a solid into a stirred smectite clay slurry containing 0.1% to 5% by weight of clay. Alternatively, a suspension of lime (CaO) in water can be added to the stirred suspension of smectite clay in water. The resulting suspension is then treated with the second metal component in an amount sufficient that at sulfur dioxide oxidation temperatures some or all of CaO sites react with $SO_3$ to form $CaSO_4$. The action of water on CaO results in the formation of $Ca(OH)_2$ in essentially quantitative yields, as judged by x-ray powder diffraction. The stirring procedure is carried out to facilitate the proper dispersion of basic $Ca(OH)_2$ particles onto the smectite clay platelets. The composite thus obtained is recovered either by filtration, by centrifugation or by drying as a slurry in air or in an oven at 110° C. Several forms of smectite clays have been employed in this invention, namely, Na-montmorillonite from Crook County, Wyoming, USA, Ca-montmorillonite from Apache County, Arizona, USA and Bentonite clay form Bentonite Corporation, Belle Fourche, South Dakota, USA. It is preferred that clay suspension contains less than 5% w/w clay. At higher concentrations these slurries tend to form gels and thus making the subsequent mixing process with CaO base difficult. It is more preferred that the clay slurries contain between 2-1% w/w clay. At these lower concentrations the dispersion of base particles within clay is much more efficient and results in formation of composites with very highly dispersed base particles. The type of smectite clay is, however, not limited to these clays. Other types of smectites such as hectorite, fluorohectorite, saponite, beidellite, nontronite, and the like also serve as good supports to disperse base particles in the composites. The amount of CaO used depends on the sorbent/clay ratio desired. Different ratios of CaO to clay were considered in this invention. Particularly good $SO_x$ reactivities were observed when calcium containing base to clay ratio is between 1:1 to 10:1. Several other transition metal oxides which are capable of oxidizing sulfur dioxide to sulfur trioxide such as $Fe_3O_4$, $TiO_2$, $CrO_3$, CuO and $V_2O_5$ are employed in this disclosure, although the types of transition metals are not limited to these examples. All these composites show higher reactivities towards $SO_x$ than the basic oxide/clay composites in absence of a transition metal oxide catalyst (Table 1 hereinafter).

In a broader sense this invention considers the use of these clay composites in controlling the sulfur oxides from gas streams, more particularly from coal-fired boiler systems. These systems include a boiler, economizer and dust collectors such as electrostatic precipitator or bag filter house ("bag house"). The injection of the sorbents into these, particularly to the boiler (700°-1000° C.) along with coal has been considered in this invention. Thus, the clay composites prepared as described above, were thermally treated in a temperature programed thermogravimetric balance at a temperature range of 500°-1000° C. in a stream of air or nitrogen/oxygen mixture, and $SO_2$ gas was introduced. The amount of $SO_2$ reacted with the sorbents was monitored as the weight uptake as described below.

The reaction of thermally activated base/clay sorbents with $SO_2$ provided a general description of the typical experimental method used to investigate reactivity. The base/clay composites prepared are heated to 900° C. under a stream of 70% nitrogen and 20% oxygen in a temperature programmed thermogravimetric balance at a rate of 5° C./min. Heating the composites to 900° C. convert the $Ca(OH)_2$ and $CaCO_3$ components to CaO, and as a result a loss in sample weight is observed. This heated sample is then exposed to $SO_2$ containing stream of air at 0.5% v/v concentration, at a flow rate of 200 ml/min for 1 h. Exposing the heated composite to $SO_2$ containing gas stream rapidly converts the CaO sites to $CaSO_4$. As a result a weight increase is observed and this weight increase corresponds to the amount of $SO_x$ adsorbed. For example, when 5.4% Fe (based on CaO used) was incorporated as $Fe_2O_3$ solid, the composite showed a 92.5% conversion of Ca sites to $CaSO_4$ when exposed to 0.5% v/v $SO_2$ for one hour, with 73.3% conversion within the first 5 min. period. For comparison a similar composite which was prepared without incorporating any oxidation catalyst resulted in a conversion of 72.2% of Ca sites in the composite to $CaSO_4$ under a similar condition, with only 53.7% conversion within first 5 min. period. In another words, for 1 h. reaction with $SO_x$, the incorporation of iron as $Fe_2O_3$, had improved the $SO_x$ uptake by the composite by about 28%. Much better results were observed when the transition metal $SO_2$ oxidation catalyst was vanadium. For example, incorporation of 5.4% V (based on CaO) as $V_2O_5$ into a composite prepared according to the above method resulted in 98.9% conversion of Ca sites to $CaSO_4$ within first 5 minutes of exposure to $SO_2$ containing gas streams.

The reaction of CaO/clay mixture with water converts CaO to Ca(OH)$_2$ during the preparation of the above clay-containing composites. X-ray powder diffraction (XRD) data on these solid composites indicate that some or all of the Ca(OH)$_2$ thus formed can be converted to calcium carbonate when the composite is exposed to carbon dioxide. Composites prepared directly from Ca(OH)$_2$ and clay suspensions also behave in this manner when exposed to CO$_2$. Even the CO$_2$ in the ambient atmosphere is sufficient to convert some Ca(OH)$_2$ to CaCO$_3$. However, by minimizing the exposure of the wet composites to CO$_2$ by drying quickly in an oven at 110° C., one can largely avoid the CaCO$_3$ formation. The composites isolated in this manner contained Ca(OH)$_2$ as the predominant calcium source, with minor quantities of CaCO$_3$. On the other hand, by exposing the wet Ca(OH)$_2$/clay composites to an atmosphere rich in CO$_2$, one may prepare a clay composite containing calcium largely in the form of CaCO3. The composites which are rich in CaCO$_3$ showed better reactivities towards SO$_x$.

The present invention also relates to a method for preparing these clay composite materials that are rich in CaCO$_3$, which are suitable for removing SO$_x$ from a flue gas and other gas streams, by adding CaO or Ca(OH)$_2$ as solids or as suspension in water to a smectite clay suspension in water. The resulting suspension is then added with the second metal component capable of oxidizing SO$_2$ to SO$_3$. The slurry is then treated with a stream of CO$_2$ gas. The XRD studies of the products isolated showed that the conversion of CaO or Ca(OH)$_2$ to CaCO$_3$ is completed after about 30 min to 1 h, depending on the amounts of materials being treated. The products are isolated as before and either dried in air or in an oven at 110° C. Instead of purging CO$_2$ gas through these slurries, one may stir these slurries in air for longer periods of time to provide ample time to convert Ca(OH)$_2$ in the slurries to CaCO$_3$ from atmospheric CO$_2$.

These composites which contained CaCO$_3$ as the base also showed enhanced SO$_x$ reactivities. For example, when 5.4% Fe (based on CaO used) was incorporated as Fe$_2$O$_3$ solid, the composite showed a 99.8% conversion of Ca sites to CaSO$_4$ when exposed to 0.5% v/v SO$_2$ for one hour, with 91.6% conversion within the first 5 min. period. For comparison a similar composite which was prepared without incorporating any oxidation catalyst resulted in a conversion of 76.7% of Ca sites in the composite to CaSO$_4$ under similar conditions, with only 68.7% conversion within first 5 min. period. In another words, for 1 h. reaction with SO$_x$, the incorporation of iron as Fe$_3$O$_4$, had improved the SO$_x$ uptake by the composite by about 20%. Comparable results were also observed when iron is incorporated as other iron oxides such as Fe$_3$O$_4$, FeOOH or pickle liquor, in these composites (Table 1 hereinafter). Much better results were observed when the transition metal SO$_2$ oxidation catalyst was vanadium. For example, incorporation of 5.4% V (based on CaO) as V$_2$O$_5$ into 5.4:1 CaCO$_3$:Na-montmorillonite composite resulted in 98.3% conversion of Ca sites to CaSO$_4$ within first 5 minutes of exposure to SO$_2$ containing gas streams Several other composites that contained transition metal oxides such as CuO and CrO$_3$ also gave sorbents that react with SO$_2$ effectively as shown in FIG. 1.

In another embodiment disclosed in this invention the effect of transition metal ion loading towards SO$_x$ reactivities were measured. Accordingly both vanadium and iron containing composites of the type CaCO$_3$/Fe$_2$O$_3$/Na-montmorillonite and CaCO$_3$/V$_2$O$_5$/Na-montmorillonite were prepared with different transition metal ion loadings. The SO$_x$ reactivities of these composites are presented in Table 3. For the composite that contained iron, gave good SO$_x$ reactivities when the iron content is between 0.1 to 15 g per 100 g of CaO, preferably between 4–10 g. For the vanadium containing composites, very good reactivities were observed when the vanadium loading is between 0.1–15 g per 100 g of CaO, preferably with 2–5% loading.

In another method disclosed in this invention, the transition metal oxide is added to clay/base slurries as aqueous sols. These sols provide very fine oxide particles that are much more effectively dispersed in the composite. Accordingly, CaO is added as a solid into a stirred smectite clay slurry containing 0.1% to 5% by weight of clay. The resulting suspension is then treated with the second metal component in the form of metal oxide sol. The amount of transition metal sol added are between 0.5% to 10% metal/CaO. The resultant slurry is then stirred well for proper dispersion of materials and the precipitate is isolated and dried in an manner described earlier to isolate a composite that is rich in Ca(OH)$_2$. Alternatively, the above dispersion is bubbled with carbon dioxide gas prior to the recovering of the precipitate, to isolate a composite that is rich in CaCO$_3$. Different transition metal sols that are capable of oxidizing sulfur dioxide to sulfur trioxide are used in this invention. These include, Fe$_3$O$_4$, TiO$_2$ and V$_2$O$_5$ although use of sols are not limited to these. A large number of other transition metal oxide sols that are suitable for the oxidation of SO$_2$ to SO$_3$, are either commercially available or can be prepared using published procedures. The composites prepared in this manner also showed very good SO$_x$ reactivities. For example, when 5.4% Fe (based on CaO used) was incorporated as Fe$_3$O$_4$ sol, the composite showed a 92.9% conversion of Ca sites to CaSO$_4$ when exposed to 0.5% v/v SO$_2$ for one hour, with 81.1% conversion occurring the first 5 min. period. Much better results were observed when the transition metal SO$_2$ oxidation catalyst was vanadium. For example incorporation of 5.4% V (based on CaO) as V$_2$O$_5$ sol into 5.4:1 CaCO$_3$: Na-montmorillonite composite resulted in 110% conversion of Ca sites to CaSO$_4$ within first 5 minutes of exposure to SO$_2$ containing gas streams. In this example, the conversion of Ca sites to CaSO$_4$ observed was greater than 100% due to the participation of some vanadium sites towards the reactivity of SO$_x$.

In another method, the clay-base slurries are treated with finely divided, water soluble transition metal salts which are capable of oxidizing SO$_2$ to SO$_3$. Accordingly, a smectite clay containing 0.1% to 5% by weight of clay is mixed with a basic material, CaO. The resulting suspension is then added with the second metal component in the form of water soluble metal salt, in an amount sufficient that at sulfur dioxide oxidation temperatures some or all of CaO sites reacts with SO$_3$ to form CaSO$_4$. The resulting slurries are mixed well and bubbled with carbon dioxide gas for a period of 30 min. to 1 h. to convert most of Ca(OH)$_2$ to CaCO$_3$. The precipitates are recovered by filtration and dried as a slurry at ambient temperatures or in an oven at temperatures between 100°–110° C. to obtain the base/clay composites These composites contained CaCO$_3$ as major source of sorbent with minor quantities of Ca- (OH)$_2$. The composites that are rich in Ca(OH)$_2$ are prepared by isolating the clay/base slurry that contains the transition metal salt, prior to CO$_2$ gas treatment. The incorporation of 0.1–10% transition metal ions based on CaO present in the composites, showed better SO$_x$ reactivities.

Alternatively these soluble transition metals can be impregnated into clay/base composites by incipient wetness method. Impregnation with an oxidation catalyst may be carried out by contacting the clay/base composite with a solution of the metal salt, preferably an aqueous solution. Accordingly, the clay/base composites are prepared according to the above procedures, by adding CaO as a solid into a stirred smectite clay slurry containing 0.1% to 5% by weight of clay, The slurry is then stirred well for proper dispersion of materials. The resultant precipitates are then recovered by filtration and dried at a temperature between 100°–120° C. to obtain the base/clay composites. The composites prepared in this manner are rich in Ca(OH)$_2$. Alternatively the above dispersion is bubbled with carbon dioxide gas prior to the recovering of the precipitate to isolate a composite that is rich in CaCO$_3$. These solid composites are then impregnated with aqueous transition metal salts that are capable of oxidizing SO$_2$ to SO$_3$ and dried at ambient temperatures.

Several transition metal salts such as, NH$_4$VO$_3$, FeCl$_3$, Fe(NO$_3$)$_3$ were employed. Upon calcination, the composites prepared in this manner formed reactive metal oxide catalysts capable of oxidizing SO$_2$ to SO$_3$ at elevated temperatures. For example, when 5.4% V (based on CaO used) was incorporated as NH$_4$VO$_3$, the composite showed a 99.0% conversion of Ca sites to CaSO$_4$ when exposed to 0.5% v/v SO$_2$ for one hour, with 98.4% conversion occurring the first 5 min. period. However, the composite which was prepared by incorporating 5.4% Fe as FeCl$_3$ or Fe(NO$_3$)$_3$ showed much lower SO$_x$ reactivities. These SO$_x$ uptakes observed were even lower than the SO$_x$ uptake observed for the CaCO$_3$/Na-montmorillonite composite prepared without adding any oxidation catalyst. The reason for this low SO$_x$ reactivities may be due to the presence of Cl$^-$ and NO$_3^-$ ions. In our previous patent (U.S. patent application Ser. No. 07/553,254, filed Jul. 16, 1990 and now U.S Pat. No. 5,219,536) we have pointed out the adverse effect of chloride ions on SO$_x$ removal. It has been also shown by other workers that there is a decreased limestone reactivity with increased chloride ion concentration. (Chang, J. C. S., Kaplan, N. and Brna, T. G. in "Fossil Fuels Utilization: Environmental Concerns" (Eds. R. Markuszewski, B. Blaustein) Chap. 15).

Generally, the transition metal salt can be a simple water-soluble form such as a carbonate, sulfate, acetate, formate or it may be a water soluble metal complex containing chelates such as oxalate, malonate, succinate, glutarate, maleoate, phthalate, tartarate, acetylacetonate and its derivatives, hydrazine and its derivatives and mixtures of above. The primary criterion for choosing a complexing agent or agents is that the agent or the agents chosen provide a "water soluble" metal compound, and should not have a substantial detrimental effect on the present process or on the product composite composition. As pointed out earlier, thus, nitrate and chloride salts are not suitable, since these ions lower the SO$_x$ reactivity of the composites. The composite impregnated by metal salt, when dried and thermally treated to reaction temperature, may exist in the final product at least in part as a compound such as the oxide, sulfide, and the like or in the elemental state.

In another preferred method, the SO$_2$ oxidation catalysts are introduced into the clay structure, particularly into the clay galleries as transition metal containing cations. Both iron-pillared and chromia-pillared montmorillonites clays are employed for base/clay composite preparation. These clays contained Fe and Cr metals respectively, in the form of hydroxo-cations in their galleries. Upon calcination, the hydroxy-metal ions decompose to corresponding metal oxides which are capable of oxidizing SO$_2$ to SO$_3$ at elevated temperatures within clay galleries. Accordingly, the clay/base composites are prepared as disclosed above by adding CaO as a solid into a stirred transition metal pillared-smectite clay slurry containing 0.1% to 5% by weight of clay. The resultant slurry is then stirred well for proper dispersion of materials and the precipitate is isolated and dried in an manner described earlier to isolate a composite that is rich in Ca(OH)$_2$. Alternatively the above dispersion is bubbled with carbon dioxide gas prior to the recovering of the precipitate to isolate a composite that is rich in CaCO$_3$. The resultant precipitates are recovered by filtration or as a slurry and dried as before to obtain the base/clay composites. The composites prepared in this manner showed very good reactivities towards SO$_2$. For example, Ca(OH)$_2$/CaCO$_3$/Fe-pillared clay composite showed a conversion of almost all of Ca sites to CaSO$_4$ when exposed to 0.5% v/v SO$_2$ for one hour, with 80.7% conversion occurring during the first 5 min. Similarly, Ca(OH)$_2$/CaCO$_3$/Cr-pillared clay composite showed a 99.4% conversion of Ca sites to CaSO$_4$ after 1 hour exposure to SO$_2$ under similar conditions with 87.8% conversion occurring during first 5 min. The composites that predominantly contain CaCO$_3$ showed much higher initial SO$_x$ reactivities than the composite that contained both Ca(OH)$_2$ and CaCO$_3$. For example CaCO$_3$/Fe-pillared clay composite showed a conversion of 93% Ca sites to CaSO$_4$ when exposed to 0.5% v/v SO$_2$ for one hour, with 86.3% conversion occurring during the first 5 min. Similarly, CaCO$_3$/Cr-pillared clay composite showed a 99.9% conversion of Ca sites to CaSO$_4$ after 1 hour exposure to SO$_2$ under similar conditions with 94.7% conversion occurring during first 5 min.

These methods developed in this invention result in the formation of Ca(OH)$_2$ and/or CaCO$_3$ clay composites without the use of a soluble base or a soluble base precursor. Further, the methods disclosed here do not require time consuming steps of washing the (Ca(OH)$_2$ and/or CaCO$_3$)/clay composites to remove excess sodium and chloride ions. Therefore, the methods described in this patent are the preferred ones for the formation of Ca(OH)$_2$/clay composites, CaCO$_3$/clay composites, or mixed Ca(OH)$_2$ and CaCO$_3$/clay composites of varying ratios, which are used to remove SO$_x$ from flue gas of coal-burning power plants.

Figure 2:
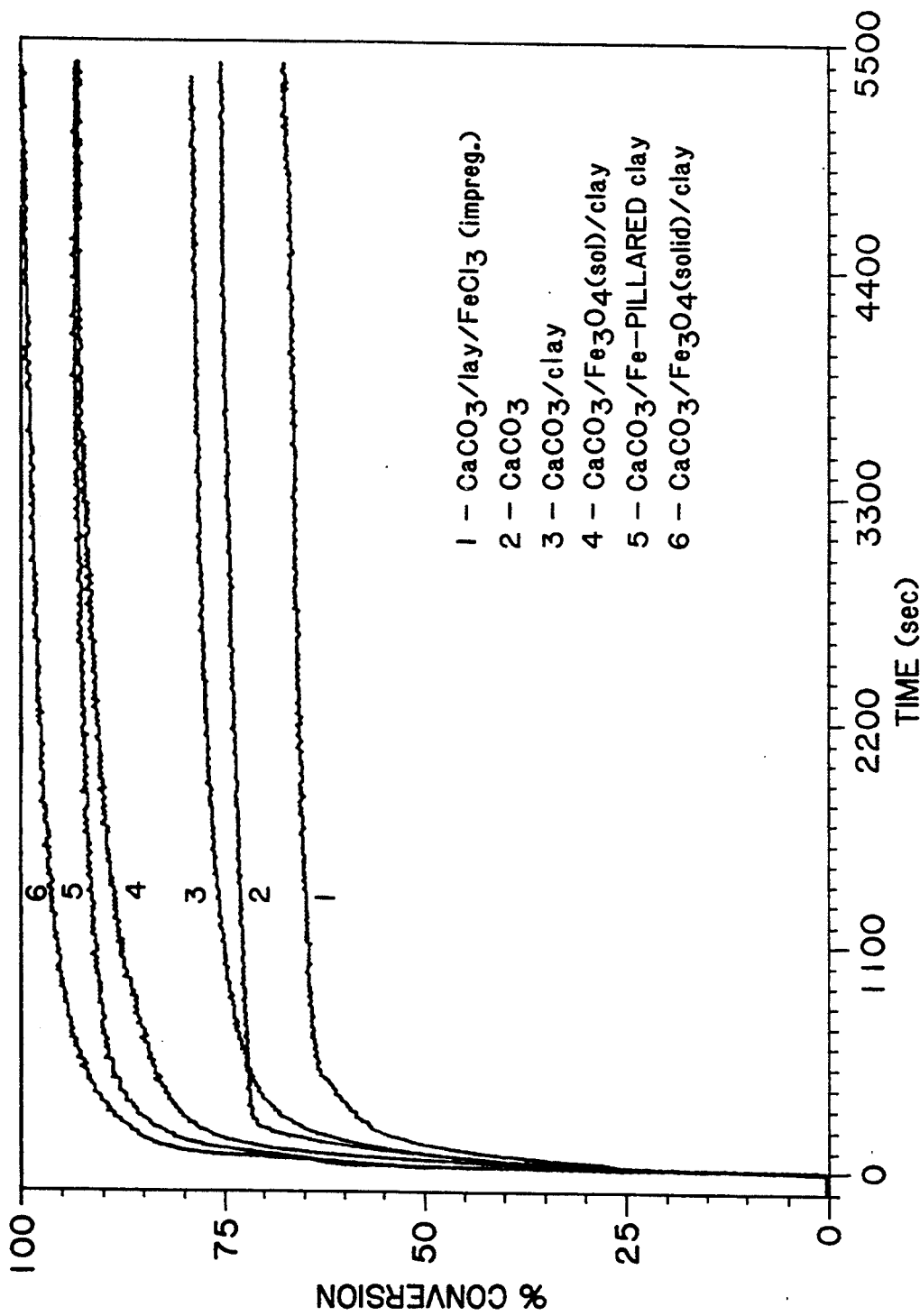
FIG. 2 is a graph showing SO$_2$ reactivity of different CaCO$_3$/clay composites containing iron as an oxidation catalyst. The CaO/Clay weight ratio was 3:1 and the transition metal loading is as indicated by nos. 1 to 6 at 5.4 g/100 g CaO except for Fe-pillared clay (ca. 10 g Fe/100 g CaO). The reaction was at 900° C. in 80% N$_2$/20% O$_2$ gas stream with 5000 ppm SO$_2$. The percent conversion is expressed as fraction of Ca sites converted to CaSO4.

It is evident from the foregoing discussion that the addition of transition metal ions into CaO/clay compositions increase the SO$_x$ reactivity significantly (FIG. 2). For example, the oxidation catalyst iron can be incorporated into the composite as oxides, soluble metal salts or as metal containing cations into clay structure. However incorporation of Fe as iron nitrate or chloride resulted in poor SO$_x$ reactivities, due to detrimental effect by chloride and nitrate ions on reactivity of Ca sites towards SO$_x$. Hence, incorporation of iron as FeCl$_3$ or Fe(NO$_3$)$_3$ into these composites are not preferred as disclosed in our previous invention (U.S. patent application Ser. No. 07/553,254, filed Jul. 16, 1990 and now U.S. Pat. No. 5,219,536). The $SO_2$ oxidation catalysts are not limited to transition metals or their salts. Other metals such as lanthanides, rare earth metals and their salts which are known to be good $SO_2$ oxidation catalysts also should work equally well. Moreover, the oxidation catalyst can be a mixture of two metal. For example, the incorporation of vanadium into iron-containing composites should improve their reactivity towards $SO_x$, since vanadium containing sorbents show much higher $SO_x$ reactivities.

Instead of CaO as the base precursor, one may use $Ca(OH)_2$ or $CaCO_3$ in preparing these clay-base composites. Accordingly, in an another method of the present invention, we considered the preparation of both $Ca(OH)_2$ containing and $CaCO_3$ containing composites using $Ca(OH)_2$ and $CaCO_3$ from Mississippi Lime Company, Geneview, Missouri. These composites also showed very good $SO_x$ reactivities. Both $Ca(OH)_2$/$V_2O_5$/Na-montmorillonite and $CaCO_3$/$V_2O_5$/Na-montmorillonite composites prepared in this manner showed complete conversion of Ca sites $CaSO_4$ within first 5 min. of exposure to $SO_2$ containing gas streams (Table 1 hereinafter). Virtually any calcium salt, that will form CaO at elevated temperatures may be employed as the base precursors in making these clay/base composites. Some suitable calcium precursors include, calcium nitrate, calcium sulfate, calcium acetate, calcium oxalate, etc,. However, in preparing these base/clay composites, lime is the preferred base precursor, since it can be converted conveniently and less expensively to highly reactive $Ca(OH)_2$ in the presence of aqueous clay slurries or to $CaCO_3$ by exposing to $CO_2$ gas. The addition of carbon dioxide has the added advantage of further reducing the particle size of these composites and enhancing the $SO_x$ reactivities. In addition, calcium alkali can be added in the form of slaked lime, hydrated lime, calcidic lime, dolomitic lime, etc,. Moreover, base precursors, such as $CaCO_3$ and $Ca(OH)_2$ can be obtained starting with soluble calcium salts such as calcium chloride, calcium nitrate, calcium acetate, calcium oxalate, etc., and a suitable water soluble hydroxides such as sodium hydroxide, ammonium hydroxide or a carbonate such as sodium carbonate, etc. For economic reasons, due to its lower cost, the preferred sorbents are lime, hydrated lime, or carbonated lime. Furthermore, the base used in this invention is not limited to calcium salts. The base can be derived from any alkaline earth metal salt such as magnesium or from any alkali metal salt, including those of sodium, lithium, potassium, and the like.

Figure 3:
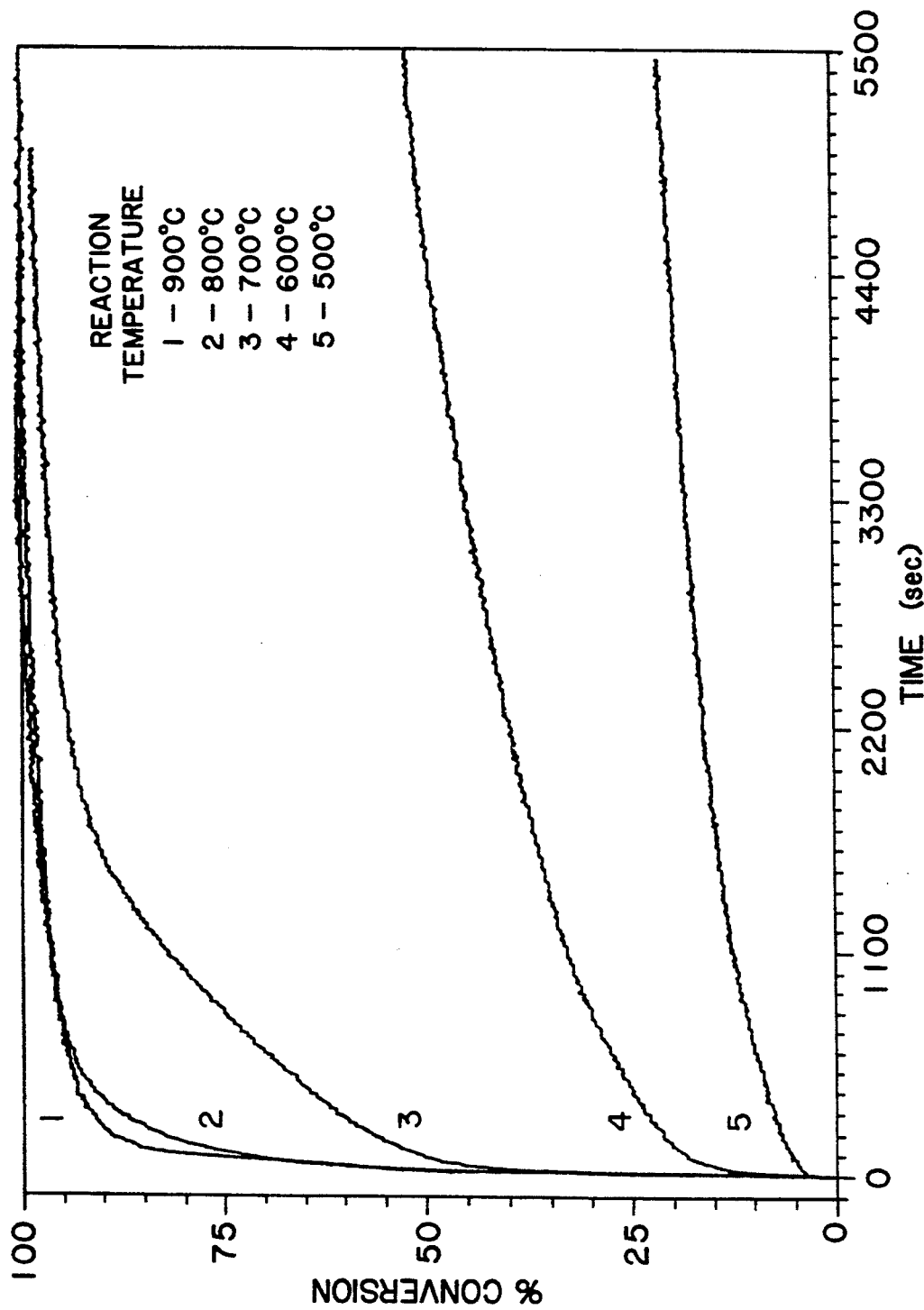
FIG. 3 is a graph showing temperature dependence for the SO$_2$ reactivity of CaCO$_3$/Fe$_2$O$_3$/clay composites. The CaO/Clay weight ratio was 3:1 and transition metal loading is Fe$_2$O$_3$ at 5.4 g/100 g CaO. The reaction was in a 80% N$_2$/20% O$_2$ gas stream with 5000 ppm SO2. The percent conversion is expressed as fraction of Ca sites converted to CaSO4.

The composites disclosed in this invention show very good reactivities towards $SO_2$ at temperatures above 500° C. Thus, these composites can be pre-calcined at or above 500° C. before introducing to the coal-burning power plants. Drying and calcination can take place simultaneously when the sorbents are directly injected into the combustor. In another embodiment disclosed in this invention both $CaCO_3$/$Fe_2O_3$/Na-montmorillonite and $CaCO_3$/$V_2O_5$/Na-montmorillonite composites were first calcined to 900° C. and then reacted with $SO_2$ gas at different temperatures. The results are presented in Table 3 hereinafter. Iron containing composites showed higher $SO_x$ reactivity at temperatures above 800° C. as shown in FIG. 3, whereas vanadium containing composites showed higher reactivities above 700° C.

Several composites prepared according to this invention were evaluated for their reactivity toward $SO_x$ capture in a coal fired boiler using a pilot test reactor. This reactor simulated typical boiler conditions of a coal-burning power plant. The sorbents were injected from the bottom of the reactor. The average boiler temperature was between 1150°–1250° C., and average $SO_2$ concentration, in the absence of a sorbent, was between 1200–1300 ppm. The amount of $SO_x$ depleted from the flue gas was monitored as a function of time. The results obtained for several clay/base sorbents are presented in Table 4, hereinafter. All the clay/base composites tested showed improved $SO_x$ reactivities, especially within a short time scale, compared to the lime itself. For example, the composite where the $Ca(OH)_2$ is dispersed on the bentonite clay, showed a 48% reduction of $SO_x$ during the first 5 minutes, whereas, lime showed only 36% $SO_x$ reduction. Furthermore, these pilot-scale testings also confirmed that the incorporation of $SO_2$ oxidation catalysts, such as iron oxides and vanadium oxides, improved the $SO_x$ reactivity significantly. The $CaCO_3$/$Ca(OH)_2$/$Fe_2O_3$/bentonite composite showed a reduction of 57% $SO_x$ within the first 5 minutes. Moreover, when this composite was precalcined at 800° C. to convert $CaCO_3$ to CaO, the calcined sorbent showed a 61% of reduction of $SO_x$ concentration in the flue gas within the first 5 minutes.

There are several advantages of using smectite clays in these clay/base composites. The presence of highly swellable smectite clay allow the base particles to disperse on clay particles in water, thus helping to minimize aggregation and sintering of the base particles. As a results the composites show high SOx reactivities. The methods disclosed here for the formation of base/clay composites provide materials superior to those prepared by a dry physical mixture of CaO or $Ca(OH)_2$ and clay. Furthermore, the presence of $SO_2$ oxidation catalyst facilitates the reactivity of these sorbents significantly. For instance, a twenty five percent increase in $SO_2$ reactivity was observed when iron oxide is incorporated as oxidation catalyst in the $CaCO_3$/clay composite. This reactivity is even greater when compared with bulk CaO (Table 1 hereinafter).

Furthermore, the presence of clay make these composite particles rigid and less fragile than the particles of base in the absence of the clay component. This allows easy processing of the composite to any form of particles differing sizes or shapes The $Ca(OH)_2$ formed from the slaking of lime and the $CaCO_3$ formed from the carbonation of lime or slaked lime exist as fine particles and show enhanced $SO_x$ reactivities than unprocessed lime. In practice, however, it is difficult to collect these products via a normal filtration processes due to their fine particulate nature. In the presence of smectite clays, as described in this invention, the hydration and carbonation processes in the presence of smectite clay give composites that are easily filterable. In other words, clay greatly facilitates the filtering process, particularly when the particles of $Ca(OH)_2$ and $CaCO_3$ are small and especially reactive towards $SO_x$.

The composites prepared according to the present invention have a ceramic texture suitable for withstanding attrition. Thus, in a coal-fired boiler application, the present sorbents may be injected, to the combustion zone, (e.g., the boiler, temp. 700°–1000° C.) when combustion takes place, or added with coal. Sorbents then leave the combustion zone with coal ash and can be removed from the bag house. This process will in turn, provide enough contact time for the sorbents to react with $SO_x$ from the flue gas streams. Thus the flue gas leaving the combustion zone/contacting zone systems have reduced amounts of sulfur oxide relative to the processing in the absence of present sorbents. Due to the presence of the clay support, the reacted sorbents also have the ceramic texture, which is ideal for the safe deposition without any serious environmental pollution.

EXAMPLE 1

The preparation of $Ca(OH)_2/CaCO_3$/Na-montmorillonite composites that contained different transition metal oxides that are capable of oxidizing $SO_2$ to $SO_3$ are described in this example. The transition metal oxides are added as finely divided powders. The carbon dioxide gas from air or from the water present in the reaction mixture is allowed to react with base component to form $CaCO_3$. The products isolated in this manner contained mainly $Ca(OH)_2$ and minor quantities of $CaCO_3$.

Na-montmorillonite from Crook County, Wyoming, USA was selected as the representative member of the smectite family of 2:1 layer lattice silicates. A 1.8 weight percent, wt. %, of clay was dispersed in deionized distilled water. An upper limit of 2 micron particle size was achieved by sedimentation in water and application of Stokes law of settling under gravity. Sedimentation also removed quartz and other insoluble impurities that may have been present in the clay. After purification, the clay was air dried on a glass plate or stored in an aqueous suspension. In a large scale application, it would not be necessary to purify the clay starting material, instead, the clay ore could be used directly.

To prepare clay/base composite that contained 3 parts of calcium (or CaO) to one part of clay, a 5.4 g of pulverized CaO from Mississippi Lime Company, Ste. Genevieve, Missouri was added slowly to a 100 ml of deionized distilled water while stirring in the open atmosphere for reaction with ambient $CO_2$. A 100-ml portion of 1.8 wt. % suspension of Na-montmorillonite in deionized distilled water was added to the first solution while stirring. The mode of addition of materials are not important here. Thus, CaO slurry can be added to clay suspension. Either clay or CaO can be added as solid into stirred aqueous suspension. The resultant slurry had added to it 0.43 g red $Fe_2O_3$ in the form of its finely divided powder. The amount added which was about 5.4 wt. % Fe based on CaO used. The resultant slurry was stirred for additional 5 mins. The product formed was isolated either by filtration or by drying the resultant slurry in air or in an oven at 100°–110° C. An XRD pattern of the product showed a reflection at 7.1° (12.5Å) characteristic of Na-montmorillonite and peaks at 18.0° (4.9Å), 28.6° (3.1Å), 34.0° (2.6Å) and 47.1° (1.9Å) corresponding to precipitated $Ca(OH)_2$ and a weak reflection at 29.5° (30Å) due to precipitated $CaCO_3$. These XRD data indicated that these composites are rich in $Ca(OH)_2$ and small amounts of $CaCO_3$. The presence of $Ca(OH)_2$ and $CaCO_3$ were further confirmed by thermogravimetric analyses.

Several other composites were prepared using different other iron oxides, especially different types of pigments such as red pigment ($Fe_2O_3$), black ($Fe_3O_4$) and yellow pigment (FeOOH). Furthermore, using the similar procedure, several other clay/base composites containing different transition metals such as Cu, Cr, and V were prepared using their oxides such as CuO, $CrO_3$ and $V_2O_5$. Wide variety of composites were prepared by varying the CaO/clay ratio as well as CaO/transition metal oxide (oxidation catalyst). Alternatively, instead of lime, one could use hydrated lime, $Ca(OH)_2$ as the Ca source in these preparations.

EXAMPLE 2

The preparation of $CaCO_3$/Na-montmorillonite composites that contained different transition metal oxides that are capable of oxidizing $SO_2$ to $SO_3$ are described in this example. The transition metal oxides are added as finely divided powders. The procedure is similar to Example 1 except that $CO_2$ gas was purged through the slurry to convert $Ca(OH)_2$ to $CaCO_3$. The carbon dioxide gas was introduced into the reaction mixture to react with base component to form $CaCO_3$. The products isolated in this manner contained $CaCO_3$ as the major calcium alkali with minor quantities of $Ca(OH)_2$.

To a stirred 100 ml aqueous clay slurry containing 1.8 g of Na-montmorillonite (1.8% w/w clay slurry), 5.4 g Mississippi lime was added. The mixture was stirred for few minutes to disperse the $Ca(OH)_2$ formed. The resultant slurry was then added with 0.43 g $Fe_2O_3$ in the form of its finely divided powder, which was about 5.4 wt. % Fe based on CaO used. The resultant slurry was further stirred for additional 5 mins. The $Ca(OH)_2$ formed in the resultant slurry was then converted to $CaCO_3$ by purging the $CO_2$ gas through the suspension. The composite formed was isolated either by filtration or as a slurry and dried in air or in an oven at 100°–110° C. An XRD pattern of the product showed a reflection at 7.1° (12.5Å) characteristic of Na-montmorillonite and peaks at 23.0° (3.9Å), 29.4° (3.0Å), 35.9° (2.49Å), 39.4° (2.2Å), 43.1° (2.1Å), 47.5° (1.9Å) and 48.5° (1.9Å) due to precipitated $CaCO_3$. These XRD data indicated that these composites are rich in $CaCO_3$ and small amounts of $Ca(OH)_2$. These results are further confirmed by thermogravimetric analyses.

Using a similar procedure, several other clay/base composites containing different transition metals such as Fe, Cu, Cr, V were prepared using their oxides such as $Fe_3O_4$, FeOOH, CuO, $CrO_3$ and $V_2O_5$. Wide variety of composites were prepared by varying the CaO/clay ratio as well as CaO/transition metal oxide (oxidation catalyst). Instead of precipitating $CaCO_3$ from CaO in clay slurries, one could use calcium carbonate in the form of finely divided powders. Alternatively, one could use hydrated lime $Ca(OH)_2$ as the Ca source and convert to $CaCO_3$ by purging carbon dioxide gas, in these preparations.

The preparation of $CaCO_3$/Na-montmorillonite composites and $Ca(OH)_2/CaCO_3$/Na-montmorillonite composites that contained different transition metal oxides are described in Examples 3 and 4 below. The transition metal oxides capable of oxidizing $SO_2$ to $SO_3$ are added as metal oxide sols.

The procedures are similar to Examples 1 and 2 above. Na-montmorillonite/base that are rich in $Ca(OH)_2$ are prepared according to Example 1 and composites that contained $CaCO_3$ were prepared according to Example 2. The transition metal oxide which is capable of oxidizing $SO_2$ to $SO_3$ is added as a slurry during the synthesis. The following procedure describes the preparation of $CaCO_3$/Na-montmorillonite composite which contained $Fe_3O_4$ as the oxidation catalyst.

EXAMPLE 3

Na-montmorillonite/base that are rich in Ca(OH)$_2$ are prepared according to this procedure. The transition metal oxides capable of oxidizing SO$_2$ to SO$_3$ are added as metal oxide sols.

To a stirred 100 ml aqueous clay slurry containing 1.8 g of Na-montmorillonite (1.8% w/w clay slurry), 5.4 g Mississippi lime was added. The mixture was stirred for few minutes to disperse the Ca(OH)$_2$ formed. The resultant slurry was then treated with 135 ml of 0.3 % w/w aqueous Fe$_3$O$_4$ sol, which was about 5.4 wt. % Fe based on CaO used. The slurry formed was stirred for additional 5 mins. The composite formed was isolated either by drying the resultant slurry in air or in an oven at 100°–110° C.

EXAMPLE 4

Na-montmorillonite/base that are rich in CaCO$_3$ are prepared according to this procedure. The transition metal oxides capable of oxidizing SO$_2$ to SO$_3$ are added as metal oxide sols.

To prepare the composites that are rich in CaCO$_3$ the Ca(OH)$_2$ slurry formed in the Example 3 was converted to CaCO$_3$ by purging the CO$_2$ gas through the slurry. The composite formed was isolated either by drying the resultant slurry in air or in an oven at 100°–110° C.

In a similar manner several other transition metal oxide containing base/clay composites were prepared by using several other oxides sols, such as V$_2$O$_5$ and TiO$_2$.

The Examples 5-8 describe the preparation of CaCO$_3$/Na-montmorillonite composites and Ca(OH)$_2$/CaCO$_3$/Na-montmorillonite composites that contained different transition metal oxides. The transition metal oxides capable of oxidizing SO$_2$ to SO$_3$ are incorporated into the base/clay composites by impregnation using water soluble transition metal salts. Several transition metal salts such as NH$_4$VO$_3$, FeCl$_3$, Fe(NO$_3$)$_3$ are tested in this work. Upon calcination, the composites prepared in this manner formed reactive metal oxide catalysts capable of oxidizing SO$_2$ to SO$_3$.

EXAMPLE 5

Na-montmorillonite/base composites that are rich in Ca(OH)$_2$ are prepared and isolated according to a procedure similar to Example 1 and impregnated with oxidation catalyst in the form of a water soluble transition metal salt as follows.

To prepare a clay/base composite that contained 3 parts of calcium (or CaO) to one part of clay, a 5.4 g of pulverized CaO from Mississippi Lime Company, Ste. Genevieve, Missouri was added slowly to a 100 ml of deionized distilled water while stirring in the open atmosphere for reaction with ambient CO$_2$. A 100-ml portion of 1.8 wt. % suspension of Na-montmorillonite in deionized distilled water was added to the first solution while stirring. The resultant slurry was stirred for additional 5 mins. The product formed was isolated either by filtration or by drying the slurry in air. To incorporate the vanadium catalyst, these composites were impregnated with a solution of NH$_4$VO$_3$. For example to incorporate 5.4% V/CaO, 0.25 g composite was impregnated with 0.031 g of NH$_4$VO$_3$ in 10 ml of water. The slurry was then dried in air. In a similar manner Fe catalyst was introduced into the base/clay composites using FeCl$_3$.6H$_2$O or Fe(NO$_3$)$_3$.9H$_2$O.

EXAMPLE 6

Na-montmorillonite/base composites that are rich in CaCO$_3$ are prepared and isolated according to a procedure similar Example 2 and impregnated with oxidation catalyst as follows.

To a stirred 100 ml aqueous clay slurry containing 1.8 g of Na-montmorillonite (1.8% w/w clay slurry), 5.4 g Mississippi lime was added. The mixture was stirred for few minutes to disperse the Ca(OH)$_2$ formed. The resultant slurry was stirred for additional 5 mins. The Ca(OH)$_2$ formed in the resultant slurry was then converted to CaCO$_3$ by purging the CO$_2$ gas through the suspension. The composite formed was isolated either by filtration or by drying the resultant slurry in air. To incorporate the vanadium catalyst, these composites were impregnated with a solution of NH$_4$VO$_3$. For example to incorporate 5.4% V/CaO, 0.25 g composite was impregnated with 0.031 g of NH$_4$VO$_3$ in 10 ml of water. The slurry was then dried in air. In a similar manner Fe catalyst was introduced into the base/clay composites using FeCl$_3$.6H$_2$O or Fe(NO$_3$)$_3$.9H$_2$O.

EXAMPLE 7

Na-montmorillonite/base composites that are rich in Ca(OH)$_2$ are prepared and isolated according to a procedure similar Example 1. The SO$_2$ oxidation catalyst is added as a water soluble transition metal salt during the composite synthesis.

To prepare a clay/base composite that contained 3 parts of Calcium (or CaO) to one part of clay, a 5.4 g of pulverized CaO from Mississippi Lime Company, Ste. Genevieve, Missouri was added slowly to a 100 ml of deionized distilled water while stirring in the open atmosphere for reaction with ambient CO$_2$. A 100-ml portion of 1.8 wt. % suspension of Na-montmorillonite in deionized distilled water was added to the first solution while stirring. The resultant slurry was then added with transition metal salt in the form of its finely divided powder. Amount of salt added depend on the desired transition metal loadings. To incorporate the vanadium catalyst, these composites were treated with a solution of NH$_4$VO$_3$. For example to incorporate 5.4% V/CaO the slurry was added with 0.9 g of NH$_4$VO$_3$. The resulting slurry was stirred for additional 5 min and then dried in air. In a similar manner Fe catalyst was introduced into the base/clay composites using iron salts such as FeCl$_3$.6H$_2$O or Fe (NO$_3$)$_3$.9H$_2$O.

EXAMPLE 8

Na-montmorillonite/base composites that are rich in CaCO$_3$ are prepared and isolated according to a procedure similar to Example 2. The SO$_2$ oxidation catalyst is added as a water soluble transition metal salt during the composite synthesis.

To prepare a clay/base composite that contained 3 parts of calcium (or CaO) to one part of clay, a 5.4 g of pulverized CaO from Mississippi Lime Company, Ste. Genevieve, Missouri was added slowly to a 100 ml of deionized distilled water while stirring in the open atmosphere for reaction with ambient CO$_2$. A 100-ml portion of 1.8 wt. % suspension of Na-montmorillonite in deionized distilled water was added to the first solution while stirring. The resultant slurry was then added with transition metal salt in the form of its finely divided powder. Amount of salt added depend on the desired transition metal loadings. To incorporate the vanadium catalyst, these composites were treated with a solution of NH$_4$VO$_3$. For example to incorporate 5.4% V/CaO, the slurry was added with 0.9 g of NH$_4$VO$_3$. The resulting slurry was treated with CO$_2$ to convert Ca(OH)$_2$ to CaCO$_3$ by bubbling the gas through the slurry for about one hour. The suspension was then dried in air. In a similar manner Fe catalyst was introduced into the base/clay composites using iron salts such as FeCl$_3$.6-H$_2$O or Fe(NO$_3$)$_3$.9H$_2$O.

The following Examples 9 to 12 describe the incorporation of the transition metals capable of oxidizing SO$_2$ to SO$_3$ into the montmorillonite clay structures in CaCO$_3$/Na-montmorillonite composites and Ca(OH)$_2$./CaCO$_3$/Na-montmorillonite composites. The transition metals are incorporated into the smectite clay gallery in the form of oxo-cations. In this manner both iron-pillared and chromia-pillared montmorillonite clays were used. Upon calcination, the composites prepared in this manner formed reactive metal oxide catalysts capable of oxidizing SO$_2$ to SO$_3$ at elevated temperatures.

EXAMPLE 9

This example describes the preparation of iron-pillared montmorillonite clay. The Fe-pillared montmorillonite clay was prepared according to the following procedure.

Anhydrous sodium carbonate was added slowly as a powder to a rapidly stirred solution of 0.2 M iron (III) nitrate. The amount of base added was about 2 meg/mole of metal. The solutions, which were free of a precipitate, were flushed with nitrogen to facilitate the removal of the carbon dioxide that was evolved during the hydrolysis. The solution was then aged for 24 hours at ambient temperatures. To exchange the Na$^+$ in montmorillonite clay with hydrolyzed iron cations, a 1.0 wt % suspension of the clay was added slowly to a vigorously stirred solution of the polycations. The ratio of the cation to clay was about 70 mmol/meq. Upon complete addition of clay the resultant slurry was further stirred for an additional two hours. The product was then washed to remove excess salt by the process of subsequent centrifugation, decantation, addition of deionized water, and redispersal of the product by vigorous stirring in water, until flocculation of clay occurred upon washing. The resultant Fe-pillared clay was air-dried on a glass plate at room temperature. The XRD pattern of the product showed a peaks at 3.1° and 6.3° corresponding to the basel spacing of 25.3Å.

EXAMPLE 10

This example describes the preparation of chromia-pillared montmorillonite clay.

A 0.25 M aqueous solution of sodium carbonate was added dropwise to a rapidly stirred solution of 0.05 M chromium (III) nitrate. The amount of base added was about 2 meq/mole of Cr. The solution was then aged for 36 hours at 100° C. To exchange the Na$^+$ in montmorillonite clay with hydrolyzed chromium cations, a 1.0 wt % suspension of the clay was added slowly to a vigorously stirred solution of the polycations. The ratio of the cation to clay was about 60 mmol/meq. Upon complete addition of clay the resultant slurry was further stirred for an additional two hours. The product was then washed to remove excess salt by the process of subsequent centrifugation, decantation, addition of deionized water, and redispersal of the product by vigorous stirring in water, until flocculation of clay occurred upon washing. The resultant chromia-pillared clay was air-dried on a glass plate at room temperature. The XRD pattern of the product showed a peaks at 3.4° and 6.3° corresponding to the basel spacing of 25.9Å.

EXAMPLES 11-12

The Ca (OH)$_2$/CaCO$_3$/clay and CaCO$_3$/clay composites were prepared using either iron-pillared or chromia-pillared montmorillonites according to the following procedure. The procedures are similar to Example 1 and 2. In these syntheses, iron-pillared and chromia-pillared montmorillonite clay was used instead of Na-montmorillonite.

To prepare clay/base composite that contained 3 parts of calcium (or CaO), a 5.4 g of pulverized CaO from Mississippi Lime Company, Ste. Genevieve, Missouri was added slowly to a 100 ml of deionized distilled water while stirring in the open atmosphere for reaction with ambient CO$_2$. A 100-ml portion of 1.8 wt. % suspension of iron-pillared or chromia-pillared-montmorillonite in deionized distilled water was added to the first solution while stirring. The mode of addition of materials are not important here. Thus, CaO slurry can be added to clay suspension. Furthermore, the clay and CaO can be added as solids into stirred aqueous suspension. The resultant slurry was further stirred for additional 5 mins. The product formed was isolated either by filtration or by drying the resultant slurry in air.

In order to make the composites that are rich in CaCO$_3$ the slurries were treated with CO$_2$ gas as described in Example 2, prior to the drying.

EXAMPLE 13

The samples prepared as described in Examples 1–12, above were evaluated for the performances towards the removal of SO$_2$ from a gas mixture according to the following procedure. The samples were heated to 900° C. at a rate of 5° C./min in a stream of 80% N$_2$ and 20% O$_2$ or in a stream of air During this time, the Ca(OH)$_2$ in these composites decomposes to CaO at about 500° C. and CaCO$_3$ decomposes to CaO at about 850° C. The calcined samples were held at 900° C. for further 15 minutes and SO$_2$ gas was introduced. The concentration of SO$_2$ was 5000 ppm in flowing air or in N$_2$/O$_2$ mixture. At 900° C. the oxidation catalyst present in these composites converts SO$_2$ to SO$_3$, which in turn reacts with CaO to form thermally stable CaSO$_4$ according to the following reactions;

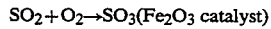

$$SO_2 + O_2 \rightarrow SO_3 (Fe_2O_3 \text{ catalyst})$$

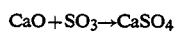

$$CaO + SO_3 \rightarrow CaSO_4$$

The conversion of CaO to CaSO$_4$ was monitored by measuring the weight uptake of the sample, using a thermogravimetric balance. These results are presented in Table 1 and FIGS. 1 to 3.

For example Ca(OH)$_2$/CaCO$_3$/Fe$_2$O$_3$-Na-montmorillonite composite that contained 3:1 CaO/clay and Fe$_3$O$_2$ solid (5.4% Fe/CaO) showed a conversion of 92.5% Ca sites to CaSO$_4$ after 1 hour of reaction with SO$_2$ in which 73.3 % conversion occurring within the first 5 minutes of reaction. Comparable SO$_x$ reactivities were observed with other iron oxides (Table 1). Much better SO$_x$ reactivities were observed when the oxidation catalyst was V$_2$O$_5$. The Ca(OH)$_2$/CaCO$_3$/V$_2$O$_5$-Na-montmorillonite composite that contained 3:1 CaO/clay and 5.4% V/CaO showed a conversion of almost all Ca sites to CaSO$_4$ within first 5 minutes. Except for the composites that contained vanadium as the oxidation catalyst, all other $CaCO_3$/T.metal oxide/Na-montmorillonite composites showed better $SO_x$ reactivities than corresponding $Ca(OH)_2/CaCO_3$/Na-montmorillonite composites. For example $CaCO_3/Fe_2O_3$-Na-montmorillonite composite that contained 3:1 CaO/clay and 5.4% Fe/CaO showed a conversion of 99.8 % Ca sites to $CaSO_4$ after 1 hour of reaction with $SO_2$ in which 91.6 % conversion occurring within the first 5 minutes of reaction. compared to corresponding $Ca(OH)_2/CaCO_3/Fe_2O_3$-Na-montmorillonite composite, the initial uptake showed by $CaCO_3$ composite was about 25% enhancement whereas the $SO_x$ reactivity after 1 hour was about 8% enhancement. The results are shown in FIG. 1.

The composites that contained other transition metal oxides such as CuO, $CrO_3$ and $TiO_2$ also showed good $SO_x$ reactivities as shown in FIG. 1. When the transition metal ions are incorporated into clay galleries, the composites show higher $SO_x$ reactivities than corresponding composites when prepared with metal oxide powders. For example, $Ca(OH)_2/CaCO_3$/Fe-pillared clay composite showed a 80.7% conversion of Ca sites to $CaSO_4$ within first 5 min of exposure to $SO_2$ containing gas compared to 73.3% conversion in $Ca(OH)_2/CaCO_3/Fe_2O_3$/Na-montmorillonite composite. When composites are prepared using chromia-pillared clay, the composite showed very good initial $SO_x$ reactivity than the corresponding composite prepared using $CrO_3$ powders. For example, $CaCO_3$/Cr-pillared clay composite showed a 94.7% conversion of Ca sites to $CaSO_4$ within first 5 min of exposure to $SO_2$ containing gas compared to 79.9% conversion in $CaCO_3/CrO_3$/Na-montmorillonite composite.

EXAMPLE 14

The $CaCO_3$/Na-montmorillonite samples containing different amounts of transition metal oxides prepared as described in Examples 2, above were evaluated for the performances towards the removal of $SO_2$ from a gas mixture according to the following procedure. The samples were heated to 900° C. at a rate of 5° C./min in a stream of 80% $N_2$ and 20% $O_2$ or in a stream of air. The calcined samples were held at 900° C. for further 15 minutes and $SO_2$ gas was introduced. The concentration of $SO_2$ was 5000 ppm in flowing air or in $N_2/O_2$ mixture. The conversion of CaO to $CaSO_4$ was monitored by measuring the weight uptake of the sample, using a thermogravimetric balance. These results are presented in Table 2.

The composite that contained vanadium and iron show very good $SO_x$ reactivities even with 3% loading of transition metal/CaO.

EXAMPLE 15

The $CaCO_3$/Na-montmorillonite composites that contained $Fe_2O_3$ and $V_2O_5$ oxidation catalysts prepared as described in Example 2 were calcined to 900° C. and the calcined materials were evaluated for the performances towards the removal of $SO_2$ from a gas mixture at different temperatures according to the following procedure.

The samples were heated to 900° C. at a rate of 5° C./min in a stream of 80% $N_2$ and 20% $O_2$ or in a stream of air using a temperature programmed furnace, to convert $CaCO_3$ to CaO. The temperature of the furnace was then brought to the reaction temperature and $SO_2$ gas was introduced. The concentration of $SO_2$ was 5000 ppm in flowing air or in $N_2/O_2$ mixture. The conversion of CaO to $CaSO_4$ was monitored by measuring the weight uptake of the sample, using a thermogravimetric balance. These results are presented in Table 3 and FIG. 3.

Vanadium containing composites showed increased $SO_x$ reactivities at temperatures above 700° C., whereas iron containing sorbents showed increased uptakes at temperatures above 800° C. The results of the Examples are shown in Table 3.

EXAMPLE 16 several base/clay composites prepared according to the examples as described previously were evaluated for the performances towards removal of $SO_2$ from a flue gas stream of a coal burning boiler. A pilot test reactor was used according to the following procedure.

The base/clay composites were injected into a coal burning boiler operating at an average temperature between 1150° C. and 1250° C. The coal was fed at a rate of 50 lb/hour and the sorbents were fed into the boiler at a rate of 50 g/min from the bottom of the boiler. The feed rates corresponded to Ca: S ratios in the range 1.4–2.0. The average $SO_2$ concentration in the boiler, in the absence of a sorbent, was between 1200–1300 ppm. The amount of $SO_2$ depleted from the boiler, in the presence of sorbents, were measured as a function of time over a period of about 15 minutes. The results obtained for the clay/base composites were compared with pure lime, and presented in Table 4. All the clay/base composites showed better $SO_x$ removal from the flue gas stream than Mississippi lime. Furthermore, the composites that contained $SO_2$ oxidation catalysts performed very well and removed up to 68% of $SO_2$ from the flue gas stream with about 60% removal within the first 5 minutes.

TABLE 1

| Activity of Base/Clay Composites for Removal of $SO_2$ from a Gas Stream[a]. | | | | | |
|---|---|---|---|---|---|
| Base | | Clay | Catalyst Loading | % Conversion[b] | |
| (CaO/clay = 3/1) | | Catalyst | g metal/100 g CaO | 5 min. | 60 min. |
| $Ca(OH)_2$ $CaCO_3$[c] | Na.mont | $Fe_2O_3$ | 5.4 | 73.3 | 2.5 |
| | | $Fe_2O_3$ | 10.0 | 72.6 | 90.7 |
| | | iron oxide mix. (Pickle liq.) | ca 5.4 | 81.5 | 98.8 |
| | | $V_2O_5$ | 5.4 | 98.9 | 100.2 |
| $Ca(OH)_2$[d] | Na.mont | $V_2O_5$ | 5.4 | 106.7 | 108.8 |
| $Ca(OH)_2$ $CaCO_3$[c] | Na.mont. | $Fe_3O_4$(sol) | 5.4 | 64.1 | 97.0 |
| | | $TiO_2$(sol) | 5.4 | 53.4 | 73.4 |

TABLE 1-continued

Activity of Base/Clay Composites for Removal of $SO_2$ from a Gas Stream[a].

| Base (CaO/clay = 3/1) | Clay | Catalyst | Catalyst Loading g metal/100 g CaO | % Conversion[b] 5 min. | % Conversion[b] 60 min. |
|---|---|---|---|---|---|
| | | $V_2O_5$(sol) | 5.4 | 112.6 | 113.0 |
| | Na.bent. | $Fe_2O_3$ | 5.4 | 76.7 | 95.9 |
| | Fe-pill mont | $Fe_2O_3$ | ca. 10 | 80.7 | 103.3 |
| | Cr-pill mont | $CrO_3$ | ca. 7 | 87.8 | 99.4 |
| | Na.mont | none | — | 53.7 | 72.2 |
| $CaCO_3$[c] | Na.mont | $Fe_3O_4$ | 5.4 | 89.4 | 98.8 |
| | | $Fe_2O_3$ | 5.4 | 91.6 | 99.8 |
| | | FeOOH | 5.4 | 92.6 | 100.0 |
| | | iron oxide mix. (pickle liq.) | 5.4 | 88.8 | 98.7 |
| | | $V_2O_5$ | 5.4 | 98.3 | 100.3 |
| | | $CrO_3$ | 5.4 | 79.9 | 87.8 |
| | | CuO | 5.4 | 80.6 | 96.8 |
| | | $Fe_3O_4$(sol) | 5.4 | 81.1 | 92.9 |
| | | $TiO_2$(sol) | 5.4 | 81.3 | 96.4 |
| | | $V_2O_5$(sol) | 5.4 | 110.3 | 111.2 |
| $CaCO_3$[d] | Na.mont | $V_2O_5$ | 5.4 | 103.3 | 104.4 |
| | Fe-pill. mont. | $F_2O_3$ | ca. 10 | 86.3 | 93.0 |
| | Cr.pill. mont. | $CrO_3$ | ca. 7 | 94.7 | 99.9 |
| | Na.mont | $Fe_2O_3$ (impreg. with $Fe(NO_3)_3$) | 5.4 | 70.9 | 84.9 |
| | | $Fe_2O_3$ (impreg. with $FeCl_3$) | 5.4 | 59.3 | 66.2 |
| | | $V_2O_5$ ($NH_4VO_3$) | 5.4 | 98.4 | 99.0 |
| | | none | — | 68.7 | 76.7 |
| CaO | | | | 14.6 | 43.7 |

[a] At 900° C.; 5000 ppm $SO_2$.
[b] Fraction of Ca sites converted to $CaSO_4$ Precursor base;
[c] CaO;
[d] Ca(OH)$_2$;
[e] $CaCO_3$, all from Mississippi Lime Co. Genevieve, Missouri.
Other abbreviations:
mont., montmorillonite;
bent., bentonite;
pill., pillared.

TABLE 2

Performance of Base/clay composites for the Removal of $SO_x$ from Gas Streams at Different Transition Metal Iron Loadings

| T. Metal Loading metal/100 g CaO | % Conversion[a] $Fe_2O_3$ catalyst[b] 5 min | % Conversion[a] $Fe_2O_3$ catalyst[b] 60 min | % Conversion[a] $V_2O_5$ catalyst[b] 5 min | % Conversion[a] $V_2O_5$ catalyst[b] 60 min |
|---|---|---|---|---|
| 1.5 | 88.9 | 93.9 | 84.6 | 95.2 |
| 2.5 | 87.1 | 95.8 | 99.7 | 103.4 |
| 4.5 | — | — | 100.9 | 103.5 |
| 5.5 | 91.6 | 99.8 | 98.3 | 100.3 |
| 7.5 | 90.5 | 99.4 | — | — |
| 10 | 90.2 | 99.8 | — | — |

[a] Fraction of Ca as CaO converted to $CaSO_4$ at a given time. Reaction at 900° C.; 5000 ppm $SO_2$. Composites contained 3/1 CaO/Na.mont and prepared according to Example 2.
[b] At 900° C.; 5000 ppm $SO_2$; Composites contained 5.4 M/100 g CaO, (M = V, Fe)

TABLE 3

Activity of Calcined Base/Clay Composite at Different Temperatures for the Removal of $SO_x$ from Gas Streams[a]

| Temperature °C. | % Conversion[b] ($Fe_2O_3$ catalyst) 5 min | % Conversion[b] ($Fe_2O_3$ catalyst) 60 min | % Conversion ($V_2O_5$ catalyst) 5 min | % Conversion ($V_2O_5$ catalyst) 60 min |
|---|---|---|---|---|
| 500 | 7.4 | 18.5 | 8.6 | 20.9 |
| 600 | 22.8 | 46.2 | 52.3 | 94.4 |
| 700 | 61.8 | 94.8 | 100.3 | 100.5 |
| 800 | 88.2 | 100.9 | 100.5 | 100.8 |
| 900 | 82.8 | 95.8 | 98.3 | 100.3 |
| 1000 | 86.2 | 95.4 | 99.5 | 100.3 |

[a] 5000 ppm $SO_2$; Reaction at 900° C. Composites prepared according to Example 2. Composite contained 5.4 g M/100 g CaO, (M = V, Fe); CaO/Na.mont, 3/1
[b] Fraction of Ca sites converted to $CaSO_4$ at a given time

TABLE 4

Performance of Base/Clay Composites in a Coal-Burning Boiler of a Pilot Test Reactor

| Sorbent | Ca/S | % $SO_x$ Removal After 5 min. | 10 min. | 15 min. |
|---|---|---|---|---|
| Lime | 2.0 | 36 | 43 | 51 |
| Ca(OH)$_2$/Clay | 1.5 | 50 | 54 | 56 |
| Ca(OH)$_2$/Clay/Fe$_3$O$_4$ | 1.4 | 56 | 55 | 52 |
| Ca(OH)$_2$/CaCO$_3$/Clay/Fe$_3$O$_4$ | 1.4 | 53 | 54 | 58 |
| Ca(OH)$_2$/CaCO$_3$/Clay/Fe$_3$O$_4$ (Calcined to 800° C.) | 1.4 | 61 | 69 | — |
| Ca(OH)$_2$/CaCO$_3$/Clay/V$_2$O$_5$ | 1.4 | 54 | 56 | 59 |

Clay = Na-bentonite;
Coal feed = 226980 g/h;
Sorbent feed = 50 g/min
Sorbent particle size = −325 mesh: Average boiler flame temperature = 1150° C.−1250° C.

We claim:

1. A method for preparing a composite material useful for $SO_x$ removal from a flue gas stream of a coal burning power plant and other gas streams which comprises:
   (a) providing a mixture with water of a smectite clay, a basic compound selected from the group consisting of alkaline earth metal oxides, hydroxides, carbonates and mixtures thereof dispersed in the clay and a quantity of a second metal ion in a form selected from the group consisting of metal oxides, metal oxide precursors and mixtures thereof dispersed in the composite, wherein the metal ion is present in an amount which promotes oxidation of sulfur dioxide to sulfur trioxide; and
   (b) heating the mixture to provide the composite material, wherein when the composite material is heated to a temperature of 500° C. or above in the presence of the $SO_x$ in the gas stream the $SO_x$ are removed by the composite material.

2. The method of claim 1 wherein the clay is in a $Na^+$ exchanged form.

3. A method for preparing a composite material useful for $SO_x$ removal from a flue gas stream of a coal-burning power plant and other gas streams which comprises:
   (a) providing a suspension of a smectite clay in water;
   (b) adding a quantity of basic compound selected from the group consisting of alkaline earth metal oxides, hydroxides, carbonates and mixtures thereof to the clay suspension;
   (c) adding a quantity of second metal ion in the form of a metal oxide or oxide precursor and mixtures thereof, which metal ion provides oxidation of sulfur dioxide to sulfur trioxide, in an amount sufficient that said composite material promotes the oxidation of the sulfur dioxide to sulfur trioxide at sulfur dioxide oxidation conditions to provide a resulting suspension;
   (c) mixing the resulting suspension and allowing a precipitate to form;
   (d) removing the precipitate from at least some of the water; and
   (e) heating the precipitate in air to provide the composite material, wherein when the composite material is heated to a temperature of 500° C. or above in the presence of the $SO_x$ in the gas stream, the $SO_x$ is removed by the composite material.

4. The method of claim 3 wherein the weight ratio of basic compound to clay in the composite is between 1:10 and 10:1.

5. The method in accordance with claim 3 wherein the smectite clay is selected from the group consisting montmorillonite, fluorohectorite, bentonite, nontronite, hectorite, saponite and beidellite.

6. The method of claim 5 wherein the clay is in a $Na^+$ exchanged form.

7. The method in accordance with claim 3 wherein the alkaline earth metal is selected from the group consisting of calcium and magnesium.

8. The method in accordance with claim 3 wherein the basic compound is calcium hydroxide containing minor amounts of calcium carbonate.

9. The method of claim 3 wherein the second metal ion is selected from the group consisting of transition metal cations, rare earth metal cations, and mixtures thereof.

10. The method in accordance with claim 9 wherein the second metal ion is selected from the group consisting of vanadium, iron, chromium, copper and titanium and mixtures thereof.

11. A method in accordance with claim 3 wherein the composite material is dried as a cake, crushed, and then sieved to separate a desired mesh size range.

12. The method of claim 3 wherein the said second metal ion is added in the form of a finely divided metal oxide powder.

13. The method of claim 3 wherein the said second metal ion is added in the form of an aqueous metal oxide sol.

14. The method of claim 3 wherein the said second metal ion is added in the form of a water soluble metal salt which forms the metal oxide at the elevated temperatures capable of oxidizing sulfur dioxide to sulfur trioxide.

15. The method of claim 3 wherein the said quantity of said second metal ion is between 0.1 to 20 percent by weight based on the basic compound present in the composite.

16. A method for preparing a composite material useful for $SO_x$ removal from a flue gas stream of a coal-burning power plant and other gas streams which comprises:
   (a) providing a suspension of a smectite clay in water;
   (b) adding a quantity of a basic compound selected from the group consisting of an alkaline earth metal hydroxide and alkaline earth oxide and mixtures thereof to the clay suspension;
   (c) adding a quantity of second metal ion in the form selected from the group consisting of a metal oxide, a metal oxide precursor and mixtures thereof, which provide oxidation of sulfur dioxide to sulfur trioxide in an amount sufficient that said composite material promotes the oxidation of the sulfur dioxide to sulfur trioxide at sulfur dioxide oxidation conditions to provide a resulting suspension;
   (d) providing carbon dioxide in the resulting suspension to form an alkali metal carbonate from at least some of the basic compound so that the alkali metal carbonate precipitates;
   (e) removing the precipitate from at least some of the water; and
   (f) heating the precipitate in air to provide the composite material, wherein when the composite is heated to a temperature of 500° C. or above in the presence of $SO_x$ in the gas stream, the $SO_x$ is removed by the composite material.

17. The method of claim 16 wherein the weight ratio of alkali metal carbonate to clay in the composite is between 1:10 and 10:1.

18. The method in accordance with claim 16 wherein the smectite clay is selected from the group consisting of montmorillonite, fluorohectorite, bentonite, nontronite, hectorite, saponite and beidellite.

19. The method of claim 18 wherein clay is in a $Na^+$ exchanged form.

20. A method in accordance with claim 16 wherein the alkaline earth metal is selected from the group consisting of magnesium and calcium.

21. A method in accordance with claim 16 wherein the basic compound is calcium carbonate containing a minor amount of calcium hydroxide.

22. The method of claim 16 wherein the said second metal ion is selected from the group consisting of transition metal cations, rare earth metal cations and mixtures thereof.

23. A method in accordance with claim 16 wherein the second metal ion is selected from the group consisting of vanadium, iron, chromium, copper and titanium.

24. The method in accordance with claim 16 wherein the composite material is dried as a cake, crushed, and then sieved to separate a desired mesh size range.

25. The method of claim 16 wherein the said second metal ion is added in the form of a finely divided metal oxide powder.

26. The method of claim 16 wherein the said second metal ion is added in the form of a water soluble metal salt which forms reactive metal oxides at elevated temperatures capable of oxidizing sulfur dioxide to sulfur trioxide.

27. The method of claim 16 wherein the said second metal ion is added in the form of aqueous metal oxide sol.

28. The method of claim 16 wherein the said quantity of second metal ion is between 0.1 to 20 percent by weight based on the basic compound present in the composite material.

29. A method for preparing a composite material useful for $SO_x$ removal from a flue gas stream of a coal-burning power plant and other gas streams which comprises:
(a) providing a suspension of a smectite clay in water;
(b) adding a quantity of basic compound selected from the group consisting of alkaline earth metal oxides, hydroxides, carbonates and mixtures thereof to the clay suspension to provide a resulting suspension;
(c) mixing the resulting suspension by stirring and allowing a precipitate to form;
(d) recovering the precipitate from the water by filtration, by centrifugation or as a slurry;
(e) drying the precipitate in air;
(f) adding a second metal cation to the precipitate, which provides oxidation of sulfur dioxide to sulfur trioxide in an amount sufficient that the composite promotes the oxidation of the sulfur dioxide to sulfur trioxide at sulfur dioxide oxidation conditions, as a metal salt by impregnating the dried precipitate with an aqueous solution of a metal salt containing the metal ion; and
(g) heating to form the composite material, wherein when the composite material is heated to a temperature of 500° C. or above in the presence of the $SO_x$ in the gas stream, the $SO_x$ is removed by the composite material upon contacting with the said gas stream at that temperature.

30. The method of claim 29 wherein the weight ratio of metal oxide or metal hydroxide to clay in the composite is between 1:10 and 10:1.

31. The method in accordance with claim 29 wherein the smectite clay is selected from the group consisting of montmorillonite, fluorohectorite, bentonite, nontronite, hectorite, saponite and beidellite.

32. The method in accordance with claim 29 the alkaline earth metal is selected from the consisting of magnesium and calcium.

33. The method in accordance with claim 29 wherein the base material is calcium hydroxide containing a minor amount of calcium carbonate.

34. The method of claim 29 wherein the said second metal ion is selected from the group consisting of transition metal cations, rare earth metal cations and mixtures thereof.

35. The method in accordance with claim 29 wherein the second metal ion is selected form the group consisting of vanadium, iron, chromium, copper and titanium as a salt.

36. The method in accordance with claim 29 wherein the composite material is dried as a cake, crushed, and then sieved to separate a desired mesh size range.

37. The method of claim 29 wherein the said quantity of second metal ion as the salt is between 0.1 to 20 percent based on the basic metal compound present in the composite material.

38. A method for preparing a composite material useful for $SO_x$ removal from a flue gas of a coal-burning power plant and other gas streams which comprises:
(a) providing a suspension of a smectite clay in water;
(b) adding a quantity of a basic compound selected from the group consisting of an alkaline earth metal hydroxide and alkaline earth metal oxide and mixtures thereof to the clay suspension;
(c) providing carbon dioxide in the suspension to form an alkaline earth metal carbonate from the basic compound, wherein the alkaline earth metal carbonate precipitates with the clay from the suspension containing some alkaline earth metal hydroxide;
(d) recovering the precipitate from at least some of the water;
(e) drying the precipitate in air;
(f) adding a second metal ion, which provide oxidation of sulfur dioxide to sulfur trioxide in an amount sufficient that said composite promotes the oxidation of the sulfur dioxide to sulfur trioxide at sulfur dioxide oxidation conditions, in the form of metal salt by impregnating the precipitate with an aqueous solution of metal salt; and
(g) heating to provide the composite material, wherein when the composite material is heated to a temperature of 500° C. or above in the presence of $SO_x$ in the gas stream, the $SO_x$ is removed by the composite material.

39. The method of claim 38 wherein the weight ratio of alkaline earth metal carbonate and alkaline earth metal hydroxide to clay in the composite is between 1:10 and 10:1.

40. The method in accordance with claim 38 wherein the smectite clay is selected from the group consisting of montmorillonite, fluorohectorite, bentonite, nontronite, hectorite, saponite and beidellite.

41. The method of claim 38 wherein the clay is in a $Na^+$ exchanged form.

42. The method in accordance with claim 38 wherein the alkaline earth is selected from the group consisting of magnesium and calcium.

43. The method in accordance with claim 38 wherein the based compound is in calcium carbonate containing minor amounts of calcium hydroxide.

44. The method of claim 38 wherein the said second metal ion is selected from the group consisting transition metal cations, rare earth metal cations and mixtures thereof.

45. The method in accordance with claim 44 wherein the second metal ion is selected from the group consisting of vanadium, iron, chromium, copper and titanium as salts.

46. The method in accordance with claim 38 wherein the composite material is dried as a cake, crushed, and then sieved to separate a desired mesh size.

47. The method of claim 38 wherein the said quantity of second metal ion as the salt is between about 0.1 to 20 percent by weight based on the basic compound present in the composite material.

48. A method for preparing a composite material useful for $SO_x$ removal from a flue gas stream of a coal-burning power plant and other gas streams which comprises:
   (a) providing an aqueous suspension of a pillared smectite clay containing a pillared transition metal, wherein the said transition metal promotes the oxidation of the sulfur dioxide to sulfur trioxide at sulfur dioxide oxidation conditions;
   (b) adding a quantity of basic compound selected from the group consisting of alkaline earth metal oxides, hydroxides, carbonates and mixtures thereof to the clay suspension;
   (c) mixing the resulting suspension by stirring and allowing a precipitate to form;
   (d) removing the precipitate from at least some of the water; and
   (e) heating the precipitate in air to provide the composite material, wherein when the composite material is heated to a temperature of 500° C. or above in the presence of $SO_x$ in the gas stream, the $SO_x$ is removed by the composite material.

49. The method of claim 48 wherein the weight ratio of basic compound to clay in the composite is between 1:1 and 10:1.

50. The method in accordance with claim 48 wherein the transition metal ions incorporated smectite clay is selected from the group consisting of montmorillonite, fluorohectorite, bentonite, nontronite, hectorite, saponite and beidellite.

51. The method in accordance with claim 48 wherein the alkaline earth is selected from the group consisting of magnesium and calcium.

52. The method in accordance with claim 48 wherein the basic compound is calcium hydroxide with minor amounts of calcium carbonate.

53. The method in accordance with claim 48 wherein the transition metal ion is vanadium, iron, chromium, copper and titanium.

54. The method in accordance with claim 48 wherein the composite material is dried as a cake, crushed, and then sieved to separate the desired mesh sizes.

55. The method of claim 48 wherein the said quantity of transition metal ion is between 0.1 to 20 percent by weight based on the basic compound.

56. A method for preparing a composite material useful for $SO_x$ removal from a flue gas stream of a coal-burning power plant and other gas streams which comprises:
   (a) providing a suspension in water of a smectite clay containing a pillared transition metal, wherein the said transition metal promotes the oxidation of the sulfur dioxide to sulfur trioxide at sulfur dioxide oxidation conditions;
   (b) adding a quantity of a basic compound selected from the group consisting of an alkaline earth metal hydroxide and alkaline earth oxide and mixtures thereof to the clay suspension;
   (c) providing carbon dioxide in the suspension to form alkaline earth metal carbonate and allowing a precipitate to form;
   (d) removing the precipitate from at least some of the water; and
   (e) heating the precipitate in air to provide the composite material, wherein when the composite material is heated to a temperature of 500° C. or above in the presence of $SO_x$ in the gas stream, the $SO_x$ is removed by the composite material.

57. The method of claim 56 wherein the said quantity of calcium hydroxide and calcium carbonate to clay in the composite is between 1:10 and 10:1.

58. The method in accordance with claim 56 wherein the smectite clay is selected from the group consisting of montmorillonite, fluorohectorite, bentonite, nontronite, hectorite, saponite and beidellite.

59. The method in accordance with claim 56 wherein the alkaline earth metal is selected from the group consisting of magnesium and calcium.

60. The method in accordance with claim 56 wherein the composite is calcium carbonate with minor amounts of calcium hydroxide.

61. The method in accordance with claim 56 wherein the transition metal ion is selected from the group consisting of vanadium, iron, chromium, copper and titanium.

62. The method in accordance with claim 56 wherein the composite is dried as a cake, crushed, and then sieved to separate the desired mesh sizes.

63. The method of claim 56 wherein the transition metal ion is present in an amount in clay which is between 0.1 to 20 percent by weight based on the calcium carbonate and calcium hydroxide present in the composite.

64. The method of claim 56 wherein the heating calcines the composite material.

* * * * *

UNITED STATES PATENT AND TRADEMARK OFFICE
CERTIFICATE OF CORRECTION

PATENT NO. : 5,334,564  
DATED : August 2, 1994  
INVENTOR(S) : THOMAS J. PINNAVAIA and JAYANTHA AMARASEKERA It is certified that error appears in the above—identified patent and that said Letters Patent is hereby corrected as shown below:

Item [56], under Reference Cited,
Title page, "Other Publications", "Neumann" should be --Neuwmann--.

Column 2, line 39, "Ruthyen" should be --Ruthven--.

Column 3, line 5, "Lanqmuir" should be --Langmuir--.

Column 4, line 2, "CaSO4" should be --CaSO$_4$.

Column 4, line 8, "SO2" should be --SO$_2$--.

Column 4, line 12, before "present", --The-- should be inserted.

Column 7, line 12, after "some" and before "the", --of-- should be inserted.

Column 7, line 30, "streams In" should read --stream.  In--.

Column 8, line 34, "remove" should be --removing--.

Column 8, line 51, "SO$_x$," should be --SO$_x$.--.

Column 9, line 9, "and find suitable" should read --and are found suitable--.

Column 10, line 56, before "Description", --Specific-- should be inserted.

Column 11, line 1, a period --.-- should be inserted after "minerals" and before "For".

UNITED STATES PATENT AND TRADEMARK OFFICE
CERTIFICATE OF CORRECTION

PATENT NO. : 5,334,564

DATED : August 2, 1994

INVENTOR(S) : THOMAS J. PINNAVAIA and JAYANTHA AMARASERKERA

It is certified that error appears in the above—identified patent and that said Letters Patent is hereby corrected as shown below:

Column 11, line 60, "form" should be --from--.

Column 13, line 19, "CaCO3" should be --$CaCO_3$--.

Column 13, line 52, "$Fe_3O_4$" should read --$Fe_2O_3$--.

Column 13, line 63, a period --.-- should be inserted after "streams" and before "Several".

Column 14, line 14, "slurties" should be --slurries--.

Column 14, line 67, a period --.-- should be inserted after "composites" and before "These".

Column 15, line 15, "clay, The" should read --clay. The--.

Column 18, line 48, a period --.-- should be inserted after "shapes" and before "The".

Column 19, line 56, "(30Å)" should read --(3.0Å)--.

Column 20, line 62, "(OH)2" should read --$(OH)_2$--.

Column 23, line 48, "basel" should read --basal--.

Column 24, line 3, "basel" should read --basal--.

Column 24, line 38, a period --.-- should be inserted after "air" and before "During".

Column 24, line 59, "$Fe_3O_2$" should read --$Fe_2O_3$--.

UNITED STATES PATENT AND TRADEMARK OFFICE
CERTIFICATE OF CORRECTION

PATENT NO. : 5,334,564
DATED : August 2, 1994
INVENTOR(S) : THOMAS J. PINNAVAIA and JAYANTHA AMARASEKERA It is certified that error appears in the above—identified patent and that said Letters Patent is hereby corrected as shown below:

Column 25, line 10, "compared" should read --Compared--.

Column 26, line 28, "several" should read --Several--.

Column 27, (Table 1) line 25, "Fe-pill F$_2$O$_3$" should read --Fe-pill Fe$_2$O$_3$--.

Column 27, line 57, "Composities" should read --Composites--.

Column 28, line 65, "Coal feed = 226980g/h" should read --Coal feed = 22680 g/h--.

Column 31, line 61 (Claim 32), after "Claim 29" insert --wherein--.

Column 31, line 62 (Claim 32), before "consisting" insert --group--.

Column 32, line 4 (Claim 35), "form" should read --from--.

Column 32, line 59, "based" should read --basic--.

UNITED STATES PATENT AND TRADEMARK OFFICE
CERTIFICATE OF CORRECTION

PATENT NO. : 5,334,564

DATED : August 2, 1994

INVENTOR(S) : Thomas J. Pinnavaia, et. al.

It is certified that error appears in the above-indentified patent and that said Letters Patent is hereby corrected as shown below:

Column 32, line 62, after "consisting", insert --of--.

Signed and Sealed this

Thirteenth Day of December, 1994

Attest:

BRUCE LEHMAN

Attesting Officer

Commissioner of Patents and Trademarks